(12) United States Patent
Sasaki et al.

(10) Patent No.: US 10,348,551 B2
(45) Date of Patent: Jul. 9, 2019

(54) INFORMATION PROCESSING APPARATUS, DIAGNOSIS CONTROL APPARATUS, AND COMMUNICATION APPARATUS

(71) Applicant: FUJITSU LIMITED, Kawasaki-shi, Kanagawa (JP)

(72) Inventors: Kazuko Sasaki, Kawasaki (JP); Tomoyuki Kanayama, Kawasaki (JP); Takanori Ishii, Nerima (JP); Yohei Nuno, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/678,173

(22) Filed: Aug. 16, 2017

(65) Prior Publication Data

US 2018/0091358 A1    Mar. 29, 2018

(30) Foreign Application Priority Data

Sep. 29, 2016    (JP) .................................. 2016-191805

(51) Int. Cl.
*H04L 1/00* (2006.01)
*H04L 12/24* (2006.01)
*H04L 12/26* (2006.01)

(52) U.S. Cl.
CPC .............. *H04L 41/06* (2013.01); *H04L 43/08* (2013.01); *H04L 43/0817* (2013.01); *H04L 43/50* (2013.01)

(58) Field of Classification Search
CPC ..... H04L 41/06; H04L 43/0817; H04L 43/08; H04L 43/50
See application file for complete search history.

(56) References Cited

U.S. PATENT DOCUMENTS

| 2002/0163881 | A1* | 11/2002 | Dhong ................ G06F 11/2007 370/225 |
| 2003/0145259 | A1* | 7/2003 | Kashiwakura .......... H04L 43/50 714/712 |
| 2010/0153614 | A1 | 6/2010 | Ushigome et al. |

FOREIGN PATENT DOCUMENTS

JP    2010-147702    7/2010

* cited by examiner

*Primary Examiner* — Clemence S Han
(74) *Attorney, Agent, or Firm* — Fujitsu Patent Center

(57) ABSTRACT

An information processing apparatus includes a communication apparatus and a different communication apparatus connected to the communication apparatus via a plurality of transmission paths. The communication apparatus includes a transmitting unit and a control unit. In response to designation of a transmission path targeted for diagnosis, selected amongst the transmission paths while the communication apparatus is in a state capable of data communication with the different communication apparatus using the transmission paths, the transmitting unit transmits a test signal to the targeted transmission path while the state capable of data communication with the different communication apparatus is maintained using remaining transmission paths of the transmission paths other than the targeted transmission path. The control unit diagnoses the presence or absence of an abnormality sign in the targeted transmission path based on the result of detecting the test signal in the targeted transmission path and outputs the diagnostic result.

12 Claims, 27 Drawing Sheets

DIAGNOSIS TARGET CHANNEL TABLE 270

| GROUP | DIAGNOSIS TARGET CHANNEL |
|---|---|
| 1 | Lane#0 TO Lane#3 BETWEEN CPU/CM#0 AND IOC/CM#0, Lane#0 TO Lane#3 BETWEEN IOC/CM#0 AND SAS EXP/CM#0 |
| 2 | Lane#4 TO Lane#7 BETWEEN CPU/CM#0 AND IOC/CM#0, Lane#0 TO Lane#3 BETWEEN IOC/CM#0 AND SAS EXP/CM#1 |
| ... | ... |
| 7 | Lane#0 TO Lane#3 BETWEEN CPU/CM#1 AND IOC/CM#1, Lane#0 TO Lane#3 BETWEEN IOC/CM#1 AND SAS EXP/CM#1 |
| 8 | Lane#4 TO Lane#7 BETWEEN CPU/CM#1 AND IOC/CM#1, Lane#0 TO Lane#3 BETWEEN IOC/CM#1 AND SAS EXP/CM#0 |
| ... | ... |

| SUBGROUP | DIAGNOSIS TARGET CHANNEL |
|---|---|
| 1a | Lane#0 BETWEEN CPU/CM#0 AND IOC/CM#0, Lane#0 BETWEEN IOC/CM#0 AND SAS EXP/CM#0 |
| 1b | Lane#1 BETWEEN CPU/CM#0 AND IOC/CM#0, Lane#1 BETWEEN IOC/CM#0 AND SAS EXP/CM#0 |
| 1c | Lane#2 BETWEEN CPU/CM#0 AND IOC/CM#0, Lane#2 BETWEEN IOC/CM#0 AND SAS EXP/CM#0 |
| 1d | Lane#3 BETWEEN CPU/CM#0 AND IOC/CM#0, Lane#3 BETWEEN IOC/CM#0 AND SAS EXP/CM#0 |

FIG. 14

RESULT MANAGEMENT TABLE

| CPU/CM#0 → PCH/CM#0 | DIAGNOSTIC RESULT | USE FLAG | TIMES L3, L4 |
|---|---|---|---|
| Lane#0 | NORMAL | true | X1, X2 |
| Lane#1 | NORMAL | true | X3, X4 |
| Lane#2 | ABNORMALITY SIGN | false | X5, X6 |
| Lane#3 | ABNORMAL | false | X7, X8 |

INFORMATION PROCESSING APPARATUS, DIAGNOSIS CONTROL APPARATUS, AND COMMUNICATION APPARATUS

CROSS-REFERENCE TO RELATED APPLICATION

This application is based upon and claims the benefit of priority of the prior Japanese Patent Application No. 2016-191805, filed on Sep. 29, 2016, the entire contents of which are incorporated herein by reference.

FIELD

The embodiments discussed herein are related to an information processing apparatus, a diagnosis control apparatus, and a communication apparatus.

BACKGROUND

Serial transmission has increasingly been employed to achieve high-speed signal transmission within information processing apparatuses as well as between information processing apparatuses and their peripherals. PCI Express (Peripheral Component Interconnect Express), hereinafter abbreviated as PCIe, and SAS (Serial-Attached SCSI (Small Computer System Interface)) are major standards for such high-speed serial transmission. These standards use a plurality of serial transmission paths bundled together, providing high-speed data transmission.

As technology using PCIe, the following information transmission apparatus, for example, has been proposed. Upon detecting an energy-saving switchover event, the information transmission apparatus enters a power saving mode by putting one lane amongst a plurality of lanes into an effective state while placing the remaining lanes into an idle state.

Japanese Laid-open Patent Publication No. 2010-147702

Sudden communication failure sometimes occurs when communication between communication circuits by high-speed serial transmission described above is in progress. Such communication failure may be attributed to aging degradation of a capacitor, such as an alternating current (AC) coupling capacitor, on a transmission path. Performing diagnosis to detect an abnormality sign of forthcoming communication failure may be considered as one way of dealing with this problem; however, in order to perform the diagnosis, the communication needs to be interrupted.

SUMMARY

According to an aspect, there is provided an information processing apparatus including a first communication apparatus; and a second communication apparatus configured to be connected to the first communication apparatus via a plurality of transmission paths. The first communication apparatus includes a transmitter configured to transmit, in response to designation of a transmission path targeted for diagnosis, selected amongst the transmission paths while the first communication apparatus is in a state capable of data communication with the second communication apparatus using the transmission paths, a test signal to the targeted transmission path while the state capable of data communication with the second communication apparatus is maintained by use of remaining transmission paths of the transmission paths other than the targeted transmission path; and a processor configured to perform a procedure including diagnosing presence or absence of an abnormality sign in the targeted transmission path based on a result of detecting the test signal in the targeted transmission path and outputting a diagnostic result.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 14 illustrates an example of a diagnosis target channel table;

FIG. 15 illustrates an example of result management tables;

DESCRIPTION OF EMBODIMENTS

Figure 1:
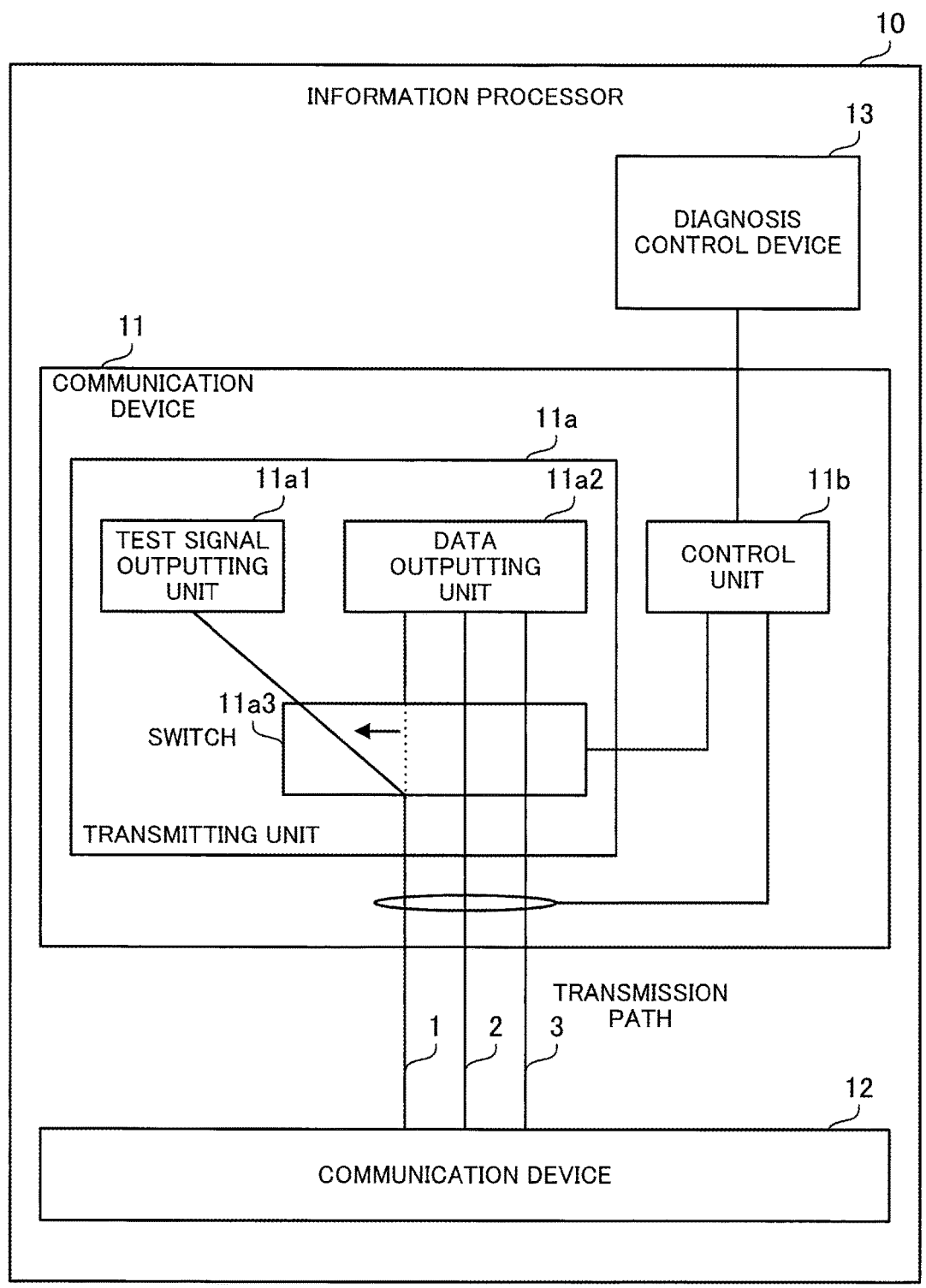
FIG. 1 illustrates a configuration and operation example of an information processor according to a first embodiment.

Several embodiments will be described below with reference to the accompanying drawings, wherein like reference numerals refer to like elements throughout.

(a) First Embodiment

FIG. 1 illustrates a configuration and operation example of an information processor according to a first embodiment. An information processor 10 illustrated in FIG. 1 includes communication devices 11 and 12. The communication devices 11 and 12 are connected to each other via transmission paths 1 to 3. The communication devices 11 and 12 are communication interfaces that communicate with each other via the transmission paths 1 to 3, each of which is a serial transmission path. The communication device 11 is able to bundle, amongst the transmission paths 1 to 3, a plurality of transmission paths together to transmit data to the communication device 12. Note that the number of transmission paths between the communication devices 11 and 12 is here three (the transmission paths 1 to 3) for the purpose of illustration; however, the communication devices 11 and 12 may be connected to each other via any number of transmission paths greater than or equal to two.

The communication device 11 includes a transmitting unit 11a and a control unit 11b. In the communication device 11, the following operations take place when a transmission path targeted for diagnosis of the presence or absence of an abnormality sign is designated from among the transmission paths 1 to 3 while the communication device 11 remains in a state capable of data communication with the communication device 12 using the transmission paths 1 to 3. Assume here that the transmission path 1, for example, is designated as the targeted transmission path. The state capable of data communication may include, for example, a state capable of data transmission and reception, a state with data being transmitted, and a state with data being received.

The transmitting unit 11a transmits a diagnostic test signal through the transmission path 1 designated as the targeted transmission path amongst the transmission paths 1 to 3 while the state capable of data communication with the communication device 12 is maintained by use of the remaining transmission paths 2 and 3. The transmitting unit 11a may have a function of receiving data from the communication device 12. The control unit 11b diagnoses the presence or absence of an abnormality sign in the transmission path 1 based on the result of detecting the test signal in the transmission path 1, and outputs the diagnostic result. Herewith, the communication device 11 is able to make a diagnosis of an abnormality sign in the transmission path 1 while keeping communication with the communication device 12. That is, it is possible to determine whether a communication abnormality is likely to develop in the transmission path 1 based on the result of detecting the test signal in the transmission path 1 while data communication is normally carried out.

The transmitting unit 11a may include, for example, a test signal outputting unit 11a1, a data outputting unit 11a2, and a switch 11a3, as illustrated in FIG. 1. The test signal outputting unit 11a1 outputs a test signal to one of input terminals on the switch 11a3. The data outputting unit 11a2 supplies data to be transmitted to the communication device 12 by distributing the data across input terminals on the switch 11a3, whose number is the same as the number of the transmission paths 1 to 3. The switch 11a3 switches connection lines between these input terminals and the transmission paths 1 to 3 according to an instruction from the control unit 11b.

In the case of implementing data transmission to the communication device 12 using the transmission paths 1 to 3, the control unit 11b controls the switch 11a3 in such a manner that, amongst all the input terminals provided on the switch 11a3, individual input terminals connected to the data outputting unit 11a2 are connected one-to-one to the transmission paths 1 to 3. On the other hand, in the case of performing diagnosis on the transmission path 1, for example, the control unit 11b controls the switch 11a3 in such a manner as to change the connection of the transmission path 1 on the switch 11a3 to, amongst all the input terminals of the switch 11a3, an input terminal connected to the test signal outputting unit 11a1. This enables diagnosis on the transmission path 1 while allowing the data outputting unit 11a2 to continue data transmission using the transmission paths 2 and 3.

Note that the targeted transmission path may be designated, for example, by a diagnosis control device 13. For example, the diagnosis control device 13 sequentially designates a targeted transmission path amongst the transmission paths 1 to 3 and notifies the communication device 11 of the designation. Herewith, the communication device 11 is able to perform diagnosis of a communication abnormality on each of the transmission paths 1 to 3 while continuing communication with the communication device 12. The diagnostic results may be transmitted to the diagnosis control device 13 from the control unit 11b. Such a diagnosis control device 13 may be provided inside the information processor 10, as illustrated in the example of FIG. 1.

The diagnosis of an abnormality sign in each of the transmission paths 1 to 3 is performed in the following manner, for example. Note that, as a test signal, a pulse signal is used, for example. When the communication device 11 starts communication with the communication device 12, the control unit 11b causes the transmitting unit 11a to transmit test signals through the individual transmission paths 1 to 3. With respect to each of the transmission paths 1 to 3, the control unit 11b detects the rise time of rising transitions of the test signal in a waveform, and stores the detected rise time in memory of the communication device 11, for example.

Subsequently, communication between the communication devices 11 and 12 is started, and a targeted transmission path is designated when data communication to the communication device 12 is in progress using the transmission paths 1 to 3. Assuming that the transmission path 1 is designated as the targeted transmission path, the transmitting unit 11a transmits a diagnostic test signal through the transmission path 1 while maintaining the data transmission to the communication device 12 by use of the remaining transmission paths 2 and 3, as described above. The control unit 11b determines whether the rise time of the test signal in a waveform, detected for the transmission path 1 lies within a determination range. The determination range is determined on the basis of the rise time detected for the transmission path 1 at the start of the communication. If the detected rise time lies outside the determination range, the control unit 11b determines that an abnormality sign is present in the transmission path 1.

The above-described diagnostic approach allows the control unit 11b to determine whether a capacitor, such as an AC coupling capacitor, inserted into the transmission path 1 has increasingly degraded with age. The communication device 11 is able to perform such diagnosis while continuing data communication by use of the remaining transmission paths 2 and 3, as described above.

(b) Second Embodiment

Figure 2:
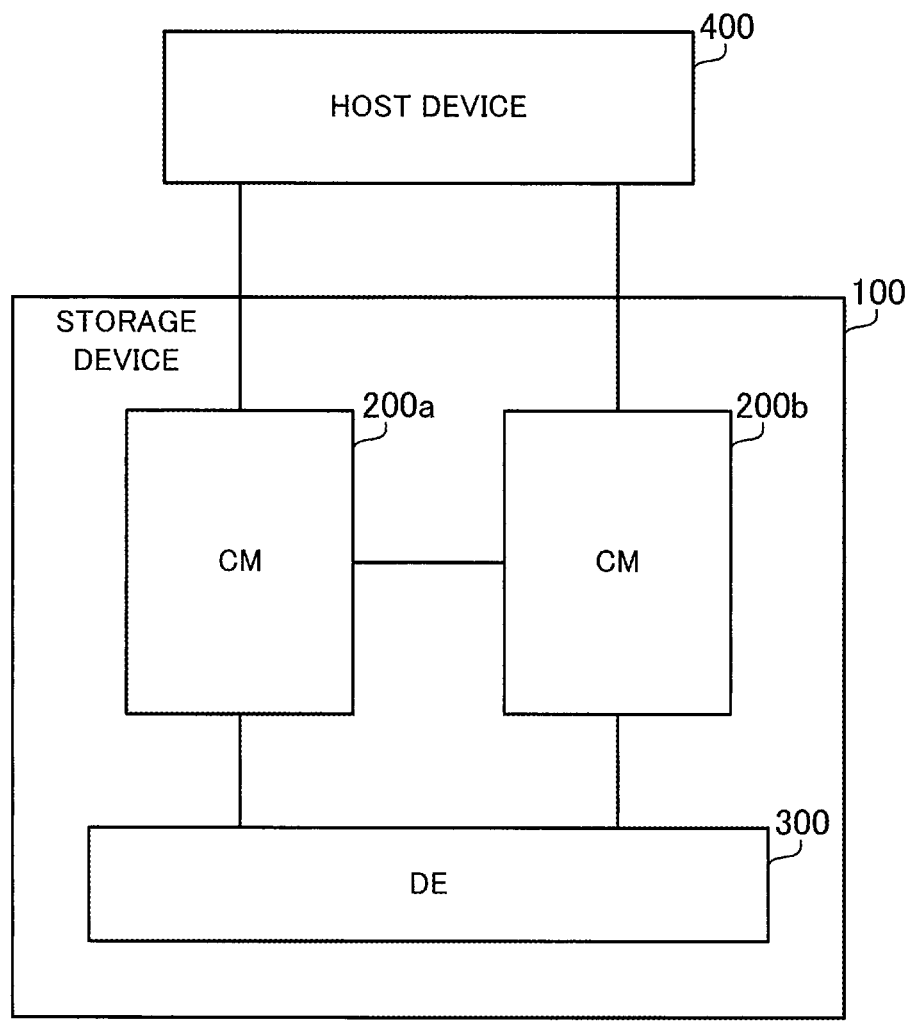
FIG. 2 illustrates an example of a storage system according to a second embodiment.

Next described is a storage system in which a storage device is employed as an example of the information processor 10 of FIG. 1. FIG. 2 illustrates an example of a storage system according to a second embodiment. The storage system includes a storage device 100 and a host device 400. The storage device 100 and the host device 400 are connected to each other via a storage area network (SAN) using a protocol such as the Fibre Channel (FC) or Internet Small Computer System Interface (iSCSI).

The storage device 100 includes controller modules (CMs) 200a and 200b and a device enclosure (DE) 300. The controller modules 200a and 200b are storage control devices for controlling access to memory devices installed in the device enclosure 300 at the request of the host device 400. One of the controller modules 200a and 200b, for example, operates as an active-system controller module while the other one operates as a standby-system controller module. Alternatively, the controller modules 200a and 200b may individually implement access control to separate logical memory areas.

The device enclosure 300 is a disk array device with hard disk drives (HDDs) serving as memory devices to be accessed from the host device 400. Note that the device enclosure 300 may be equipped, for example, with a different type of memory devices, such as solid state drives (SSDs) in place of the HDDs. The host device 400 accesses the HDDs installed in the device enclosure 300 via the controller module 200a or 200b.

Figure 3:
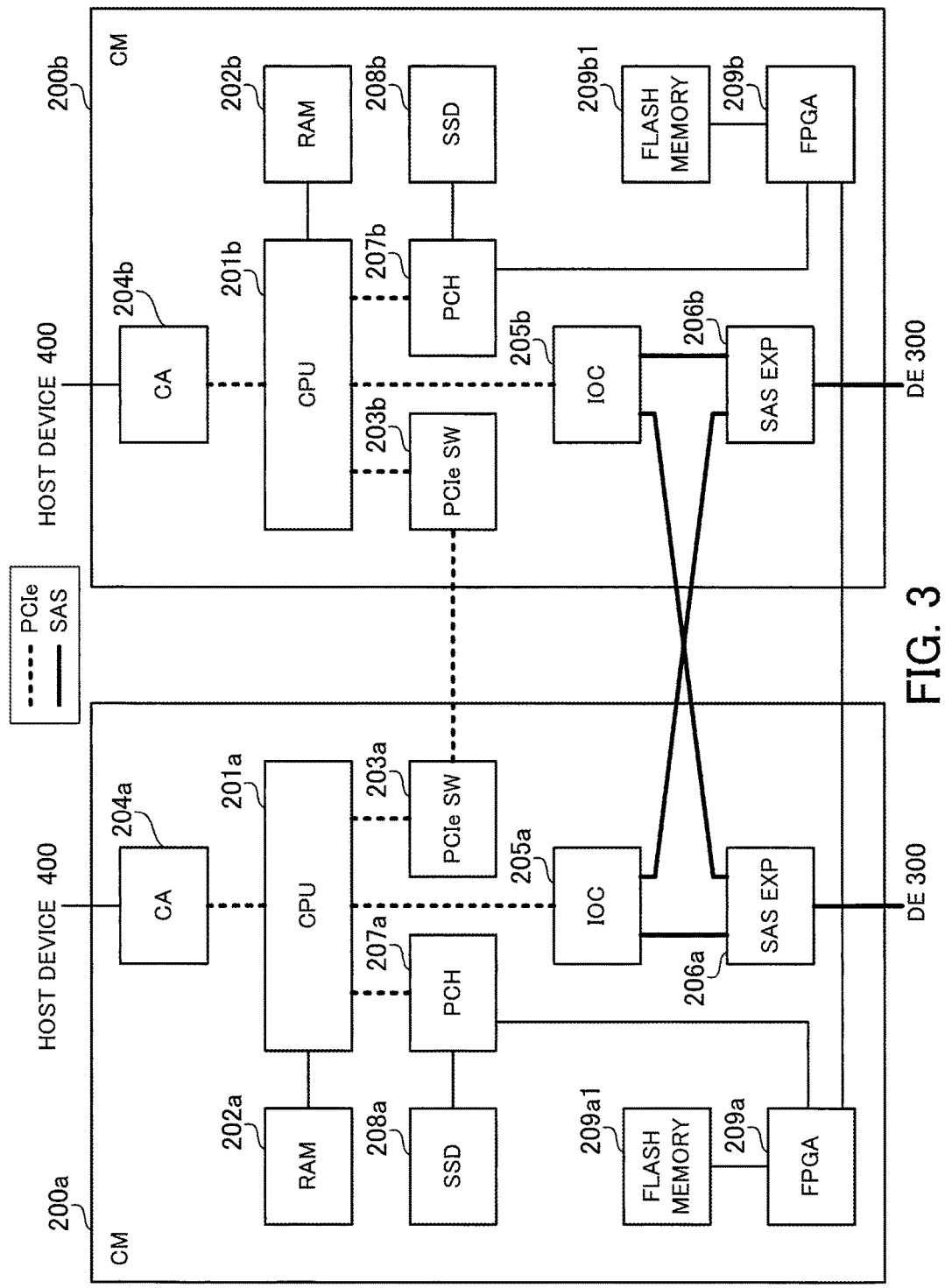
FIG. 3 illustrates an example of hardware configurations of controller modules.

FIG. 3 illustrates an example of hardware configurations of controller modules. The controller module 200a includes a central processing unit (CPU) 201a, random access memory (RAM) 202a, a PCIe switch 203a, a channel adapter (CA) 204a, an In/Out controller (IOC) 205a, a SAS expander 206a, a platform controller hub (PCH) 207a, a SSD 208a, a field programmable gate array (FPGA) 209a, and flash memory 209a1. The controller module 200b includes a CPU 201b, RAM 202b, a PCIe switch 203b, a channel adapter (CA) 204b, an IOC 205b, a SAS expander 206b, a PCH 207b, a SSD 208b, a FPGA 209b, and flash memory 209b1. The controller modules 200a and 200b have the same hardware configuration. Therefore, the following description in the second embodiment focuses mainly on the hardware configuration of the controller module 200a while appropriately omitting repeated explanation of the hardware configuration of the controller module 200b.

Overall control of the controller module 200a is exercised by the CPU 201a. The CPU 201a may be a multi-processor including a plurality of processing components. The RAM 202a is used as a main memory device of the controller module 200a, and temporarily stores therein at least part of programs to be executed by the CPU 201a and various types of data to be used in the processing of the programs. The PCIe switch 203a is connected to the CPU 201a via a PCIe bus. The PCIe switch 203a is also connected to the PCIe switch 203b in the other controller module 200b via a PCIe cable. The CPUs 201a and 201b communicate with each other through the communication channel open between the PCIe switches 203a and 203b. For example, through this communication channel, each of the CPUs 201a and 201b is able to transmit data stored in its RAM 202a/202b to the CPU 201a/201b in the other controller module 200a/200b.

The channel adapter 204a is connected to the CPU 201a via a PCIe bus. The channel adapter 204a performs interface processing, such as data transmission and reception, between the CPU 201a and the host device 400. The IOC 205a is connected to the CPU 201a via a PCIe bus. The IOC 205a is also connected to the SAS expanders 206a and 206b via SAS cables. The IOC 205a performs interface processing between the CPU 201a and the HDDs installed in the device enclosure 300. The SAS expander 206a is connected to the IOC 205a and also connected to the IOC 205b via SAS cables. In addition, the SAS expander 206a is connected to the device enclosure 300 via a SAS cable. The SAS expander 206a relays data between the IOCs 205a and 205b and the HDDs in the device enclosure 300.

Note here that the IOC 205a is connected to the device enclosure 300 via the SAS expander 206a. At the same time, the IOC 205a is also connected to the device enclosure 300 via the SAS expander 206b. Thus, the IOC 205a and the device enclosure 300 are connected with each other via the two SAS expanders 206a and 206b, thereby providing redundant access channels from the IOC 205a to the device enclosure 300. In like fashion, the IOC 205b is connected to the device enclosure 300 via the SAS expander 206b. At the same time, the IOC 205b is also connected to the device enclosure 300 via the SAS expander 206a. Thus, the IOC 205b and the device enclosure 300 are connected with each other via the two SAS expanders 206a and 206b, thereby also providing redundant access channels from the IOC 205b to the device enclosure 300.

The PCH 207a performs data transmission and reception between the CPU 201a and the SSD 208a or the FPGA 209a. The SSD 208a is used as a secondary memory device of the controller module 200a, and stores, for example, firmware to be executed by the CPU 201a. Note that a different type of non-volatile memory device, such as a HDD, may be used as the secondary memory device.

The FPGA 209a monitors the presence or absence of an abnormality in each component of the controller module 200a. As such an abnormality monitoring function, the FPGA 209a according to this embodiment has a function of controlling diagnosis for detecting abnormalities in PCIe and SAS channels inside the storage device 100. Note that the FPGA 209a includes, for example, a processor capable of executing programs and memory capable of temporarily storing data associated with the programs. In this case, the abnormality monitoring function of the FPGA 209a is implemented, for example, by execution of a program stored in the flash memory 209a1 by the processor of the FPGA 209a. The flash memory 209a1 stores information to be used in processing performed by the FPGA 209a. The FPGAs 209a and 209b are connected with each other in such a manner as to allow mirroring of data stored, for example, in the flash memory 209a1 to the other flash memory 209b1.

Figure 4:
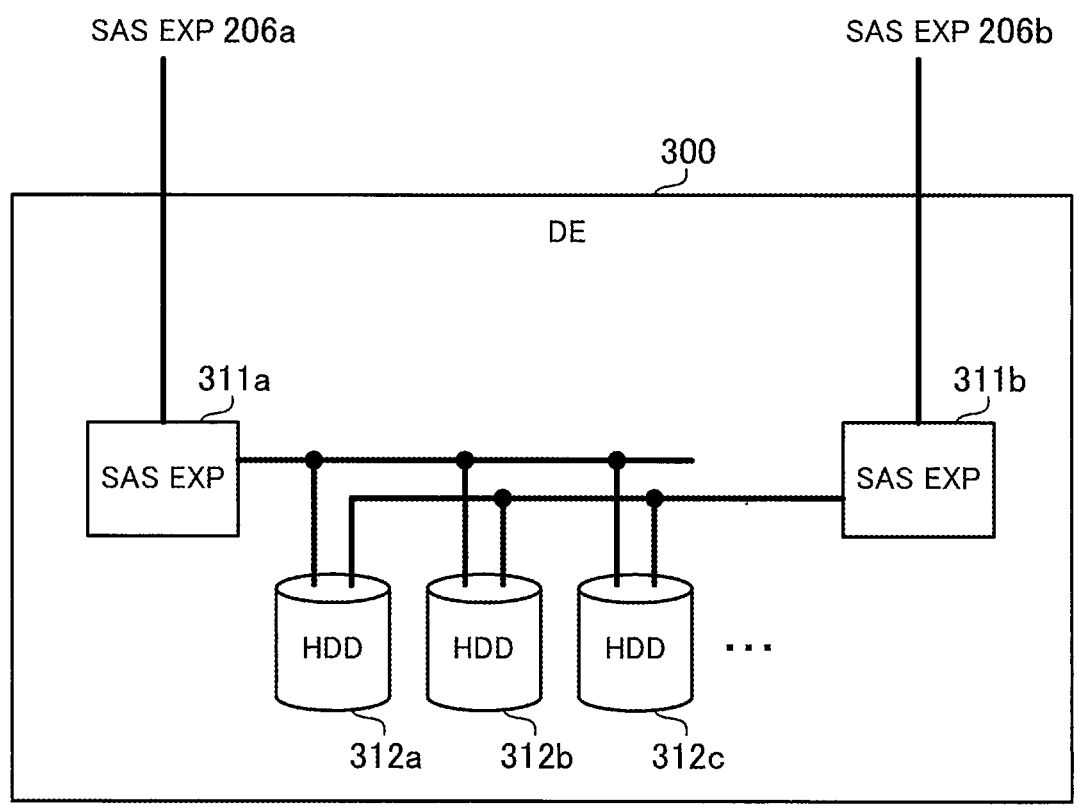
FIG. 4 illustrates an example of a hardware configuration of a device enclosure.

FIG. 4 illustrates an example of a hardware configuration of a device enclosure. The device enclosure 300 includes SAS expanders 311a and 311b and HDDs 312a, 312b, 312c and so on. The SAS expander 311a is connected to the SAS expander 206a and also connected to the HDDs 312a, 312b, 312c and so on via SAS cables. The SAS expander 311a relays data between the SAS expander 206a and the HDDs 312a, 312b, 312c and so on. The SAS expander 311b is connected to the SAS expander 206b and also connected to the HDDs 312a, 312b, 312c and so on via SAS cables. The SAS expander 311b relays data between the SAS expander 206b and the HDDs 312a, 312b, 312c and so on.

As for PCIe and SAS communication, a plurality of serial transmission paths are aggregated into a single port to facilitate high-speed data transmission. Each serial transmission path here includes a total of four signal lines, a pair of differential signal lines for transmission and a pair of differential signal lines for reception. Such a serial transmission path in PCIe is referred to as a "lane". For ease of explanation, the term "lane" is used to refer to not only a PCIe serial transmission path but also a SAS serial transmission path in the following description.

Figure 5:
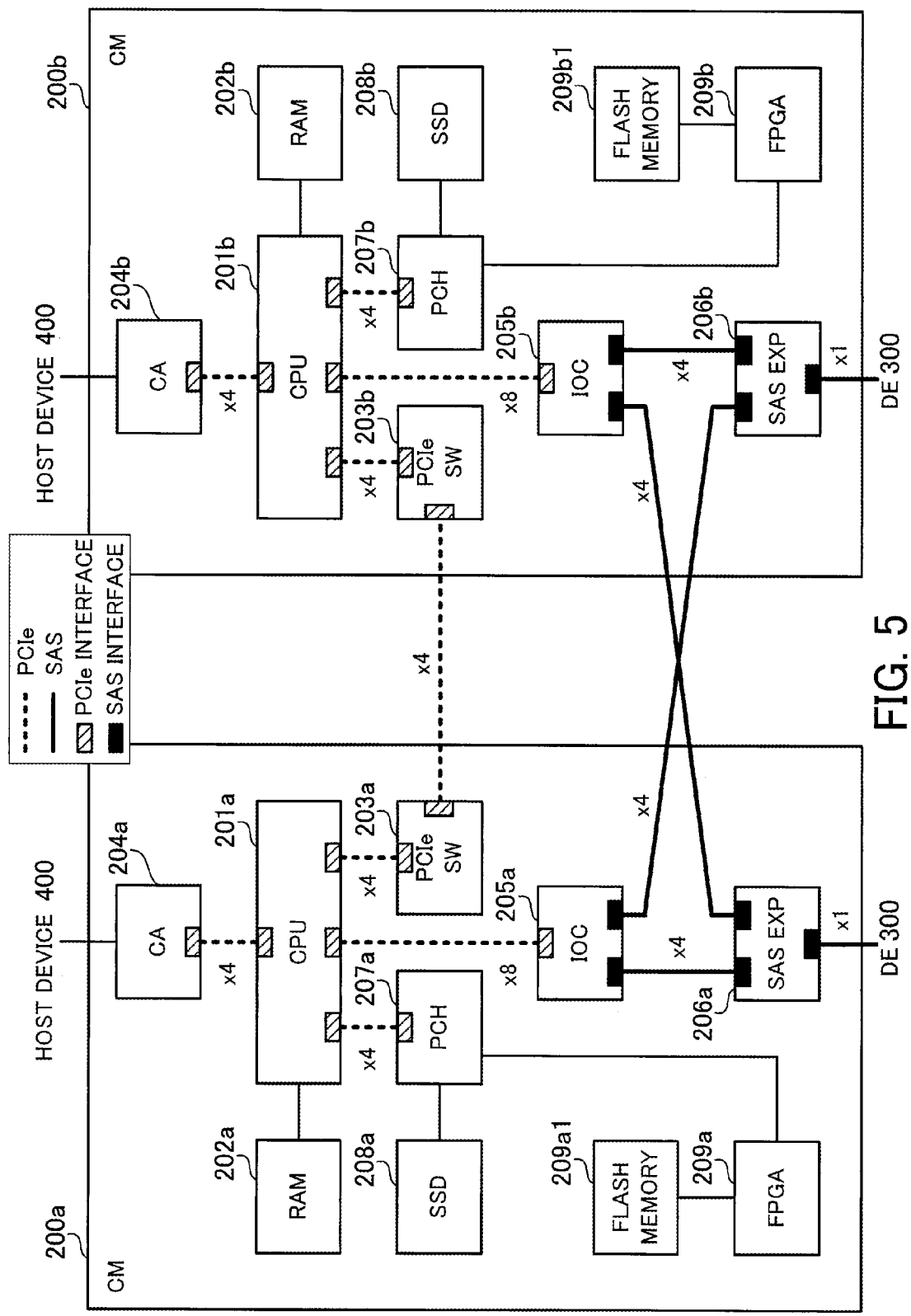
FIG. 5 illustrates an example of inter-circuit lane counts inside a storage device.

FIG. 5 illustrates an example of inter-circuit lane counts inside a storage device. Four lanes are used to connect the CPU 201a and the PCIe switch 203a. Four lanes are used to connect the CPU 201a and the channel adapter 204a. Eight lanes are used to connect the CPU 201a and the IOC 205a. Four lanes are used to connect the CPU 201a and the PCH 207a. Four lanes are used to connect the IOC 205a and the SAS expander 206a. One lane is used to connect the SAS expander 206a and the SAS expander 311a (see FIG. 4) of the device enclosure 300.

Four lanes are used to connect the CPU 201b and the PCIe switch 203b. Four lanes are used to connect the CPU 201b and the channel adapter 204b. Eight lanes are used to connect the CPU 201b and the IOC 205b. Four lanes are used to connect the CPU 201b and the PCH 207b. Four lanes are used to connect the IOC 205b and the SAS expander 206b. One lane is used to connect the SAS expander 206b and the SAS expander 311b (see FIG. 4) of the device enclosure 300. Four lanes are used to connect the PCIe switches 203a and 203b. Four lanes are used to connect the IOC 205a and the SAS expander 206b. Four lanes are used to connect the IOC 205b and the SAS expander 206a.

As illustrated in FIG. 5, each port is equipped with an interface circuit to perform communication through the lanes connected to the port. Each PCIe port is equipped with a PCIe interface to perform communication according to the PCIe standard, and each SAS port is equipped with a SAS interface to perform communication according to the SAS standard. In the example of FIG. 5, PCIe interfaces are provided for the CPUs 201a and 201b, the PCIe switches 203a and 203b, the channel adapters 204a and 204b, the IOCs 205a and 205b, and the PCHs 207a and 207b. SAS interfaces are provided for the IOCs 205a and 205b, the SAS expanders 206a and 206b, and the SAS expanders 311a and 311b. Both PCIe and SAS interfaces are provided for the IOC 205a and 205b. The PCIe and SAS interfaces have the same basic configuration. Therefore, the following description makes no distinction between these two types of interface circuits.

Figure 6:
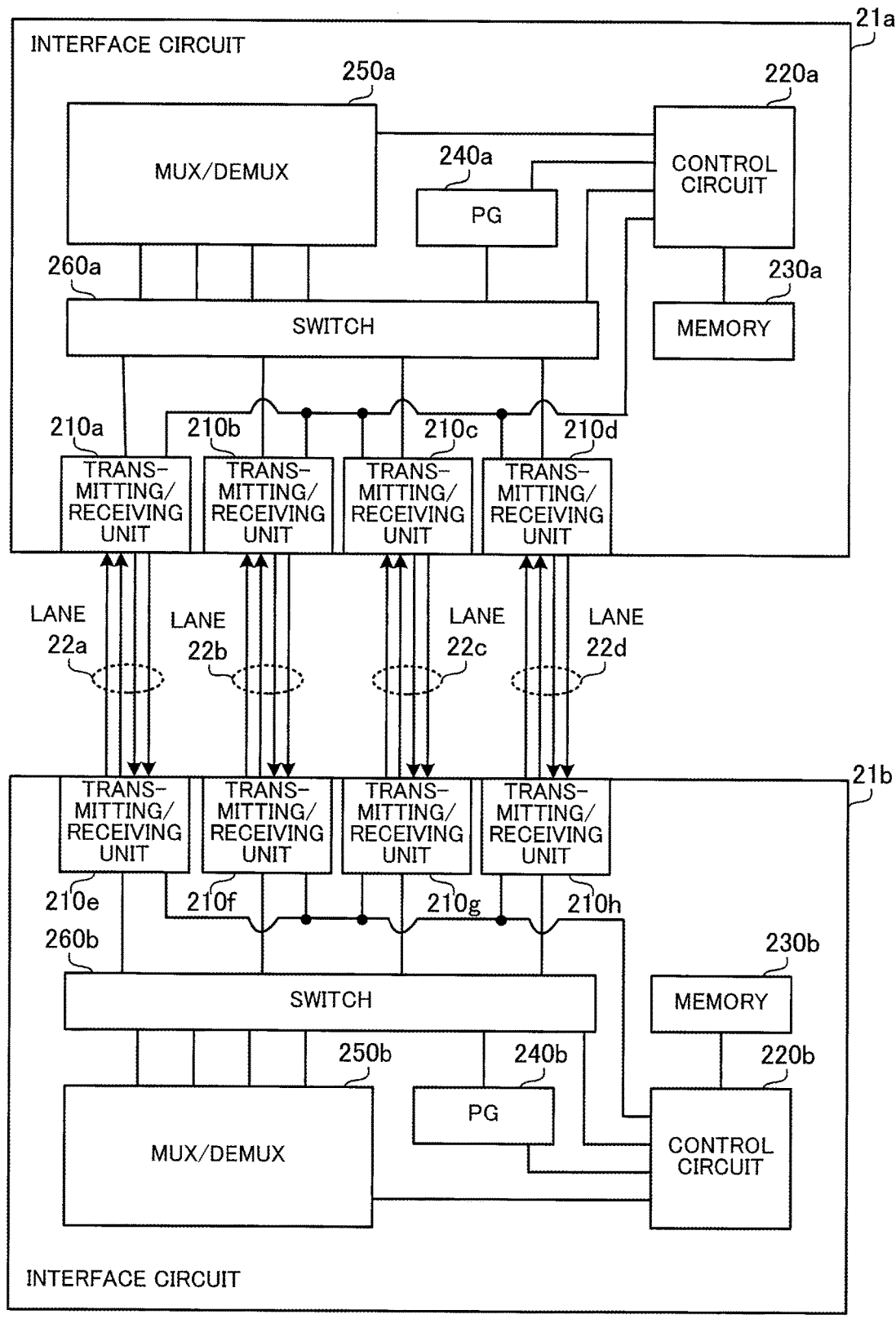
FIG. 6 illustrates an example of configurations and connection topology of interface circuits.

FIG. 6 illustrates an example of configurations and connection topology of interface circuits. The example of FIG. 6 depicts interface circuits 21a and 21b connected to each other by four lanes 22a to 22d. That is, in the example of FIG. 6, each of the interface circuits 21a and 21b performs mutual communication using up to four lanes as a single logical communication port. The interface circuit 21a includes transmitting/receiving units 210a to 210d, a control circuit 220a, memory 230a, a pulse generator (PG) 240a, a multiplexer/demultiplexer (MUX/DEMUX) 250a, and a switch 260a. The interface circuit 21b includes transmitting/receiving units 210e to 210h, a control circuit 220b, memory 230b, a pulse generator 240b, a MUX/DEMUX 250b, and a switch 260b.

The transmitting/receiving unit 210a is connected to the transmitting/receiving unit 210e via the lane 22a. The transmitting/receiving unit 210b is connected to the transmitting/receiving unit 210f via the lane 22b. The transmitting/receiving unit 210c is connected to the transmitting/receiving unit 210g via the lane 22c. The transmitting/receiving unit 210d is connected to the transmitting/receiving unit 210h via the lane 22d. Each of the transmitting/receiving units 210a to 210h controls data transmission and reception with the transmitting/receiving unit at the other endpoint. Each of the lanes 22a, 22b, 22c, and 22d is differential signal line pairs composed of a pair (2) of signal lines for transmission from one side and a pair (2) of signal lines for transmission from the other side, as described above. Note that the transmitting/receiving units 210a to 210d are connected to the differential signal line pairs that make up the lanes 22a to 22d, respectively, via a common connector. In like fashion, the transmitting/receiving units 210e to 210h are connected to the differential signal line pairs that make up the lanes 22a to 22d, respectively, via a common connector.

The control circuit 220a controls the pulse generator 240a, the MUX/DEMUX 250a, and the switch 260a. The control circuit 220a is configured to communicate with the CPU 201a, and carries out, for example, switching of the number of lanes to be used and lane diagnosis control (to be described later) according to an instruction from the CPU 201a. The memory 230a stores therein various types of data to be used by the control circuit 220a for its processing. Note that the control circuit 220a may include a processor, and at least part of the processing of the control circuit 220a may be implemented by the processor executing a firmware program stored in the memory 230a.

The pulse generator 240a is a circuit for outputting a diagnostic test signal (pulse signal) for detecting an abnormality or abnormality sign in a lane. The MUX/DEMUX 250a distributes data to be transmitted to the interface circuit 21b across the transmitting/receiving units 210a to 210d. In addition, the MUX/DEMUX 250a receives, from the transmitting/receiving units 210a to 210d, data received from the interface circuit 21b. The switch 260a switches connection lines between output terminals of the MUX/DEMUX 250a individually corresponding to the lanes 22a to 22d as well as an output terminal of the pulse generator 240a and input terminals of the individual transmitting/receiving units 210a to 210d. Details of the switch 260a are described later. Note that signals received by the transmitting/receiving units 210a to 210d are directly input to the MUX/DEMUX 250a without the switch 260a.

Functions of the control circuit 220b, the memory 230b, the pulse generator 240b, the MUX/DEMUX 250b, and the switch 260b are the same as those of the control circuit 220a, the memory 230a, the pulse generator 240a, the MUX/DEMUX 250a, and the switch 260a, respectively, and repeated descriptions thereof are omitted.

Figure 7:
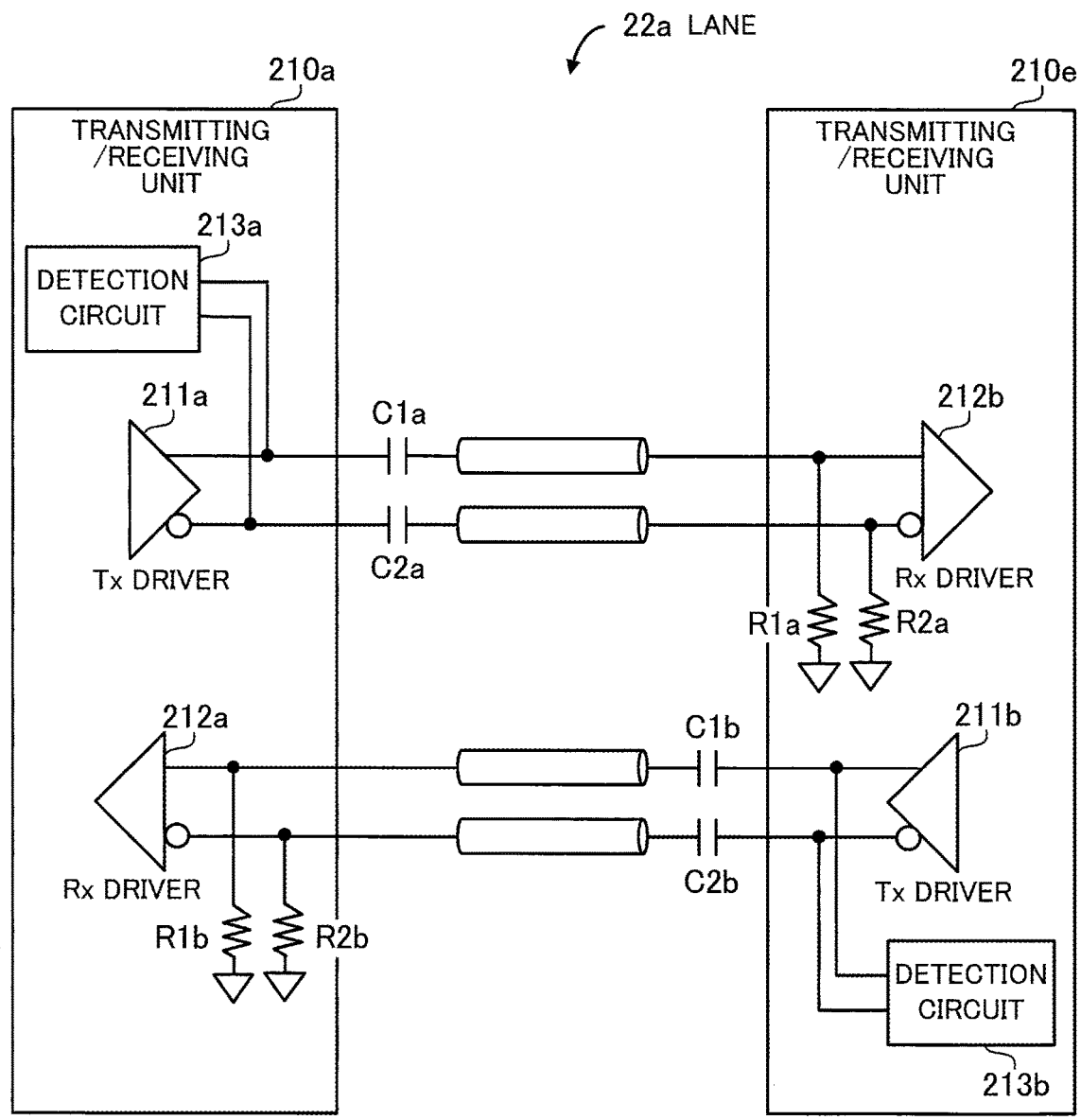
FIG. 7 illustrates an example of a configuration of a lane.

FIG. 7 illustrates an example of a configuration of a lane. The example of FIG. 7 depicts the lane 22a connecting the transmitting/receiving units 210a and 210e. The transmitting/receiving unit 210a includes a transmission (Tx) driver 211a, a reception (Rx) driver 212a, and a detection circuit 213a. The Tx driver 211a converts transmission data input from the MUX/DEMUX 250a via the switch 260a or a test signal input from the pulse generator 240a via the switch 260a into a differential signal and then outputs the differential signal. The Rx driver 212a converts a differential signal received from the transmitting/receiving unit 210e into a signal of a predetermined format and then outputs the converted signal to the MUX/DEMUX 250a.

In the case where a test signal is input to the Tx driver 211a, the detection circuit 213a monitors the voltage of a differential signal output from the Tx driver 211a. Then, the detection circuit 213a detects the time for the voltage to rise from a predetermined lower threshold to a predetermined upper threshold, and notifies the control circuit 220a of the detected time. The lower threshold is used to detect the start of a rise in the test signal, and the upper threshold is used to detect the end of a rise in the test signal. Therefore, by using the lower and upper thresholds, the detection circuit 213a is able to detect the rise time of the test signal.

Note that, in practice, the transmitting/receiving unit 210a further includes, for example, a serializer, a Tx equalizer, a Rx equalizer, and a deserializer. The serializer serializes transmission data or a test signal input thereto and then outputs the serialized data or signal to the Tx driver 211a. The Tx equalizer performs a waveform equalization to a signal output from the Tx driver 211a. As a transmitter equalization technique, pre-emphasis or preshoot, for example, is employed here. The detection circuit 213a may detect the rise time of a test signal output from the Tx equalizer. The Rx equalizer performs waveform equalization to a differential signal received from the transmitting/receiving unit 210e and then outputs the equalized signal to the Rx driver 212a. As a receiver equalization technique, Decision Feedback Equalization (DFE) or Feed-Forward Equalization (FFE), for example, is employed here. The deserializer converts a serial signal output from the Rx driver 212a into a parallel signal and then outputs the parallel signal to the MUX/DEMUX 250a.

On the other hand, the transmitting/receiving unit 210e includes a Tx driver 211b, a Rx driver 212b, and a detection circuit 213b. Functions of the Tx driver 211b, the Rx driver 212b, and the detection circuit 213b are the same as those of the Tx driver 211a, the Rx driver 212a, and the detection circuit 213a, respectively, and repeated descriptions thereof are omitted.

As for the differential signal lines extending from the transmitting/receiving unit 210a to the transmitting/receiving unit 210e, AC coupling capacitors C1a and C2a are connected in series at the transmitting ends of the individual differential signal lines, and one sides of individual termination resistors R1a and R2a whose other sides are grounded are connected at the receiving ends. The AC coupling capacitors C1a and C2a are provided internally or externally to the transmitting-side transmitting/receiving unit 210a to delete a direct-current (DC) component. Each of the termination resistors R1a and R2a has a resistance value (for example, 50Ω) defined by a communication standard concerned. The termination resistors R1a and R2a are provided internally to the receiving-side transmitting/receiving unit 210e to prevent a transmission signal from being reflected at the receiving end. As for the differential signal lines extending from the transmitting/receiving unit 210e to the transmitting/receiving unit 210a, AC coupling capacitors C1b and C2b are connected in series at the transmitting ends of the individual differential signal lines, and one sides of individual termination resistors R1b and R2b whose other sides are grounded are connected at the receiving ends.

Next described is diagnosis of lanes performed by an interface circuit. The interface circuit performs diagnosis of lanes by transmitting a pulsed test signal from the pulse generator to each lane and detects a rise timing of the voltage at the transmitting ends of the differential signal lines. This diagnosis includes two components: diagnosis to detect an abnormality in each lane; and diagnosis to detect an abnormality sign in each lane. The former diagnosis is performed at link-up right after the other endpoint interface circuit is newly connected. The latter diagnosis is basically performed during normal operation when communication with the other endpoint interface circuit is in progress after link-up.

Figure 8:
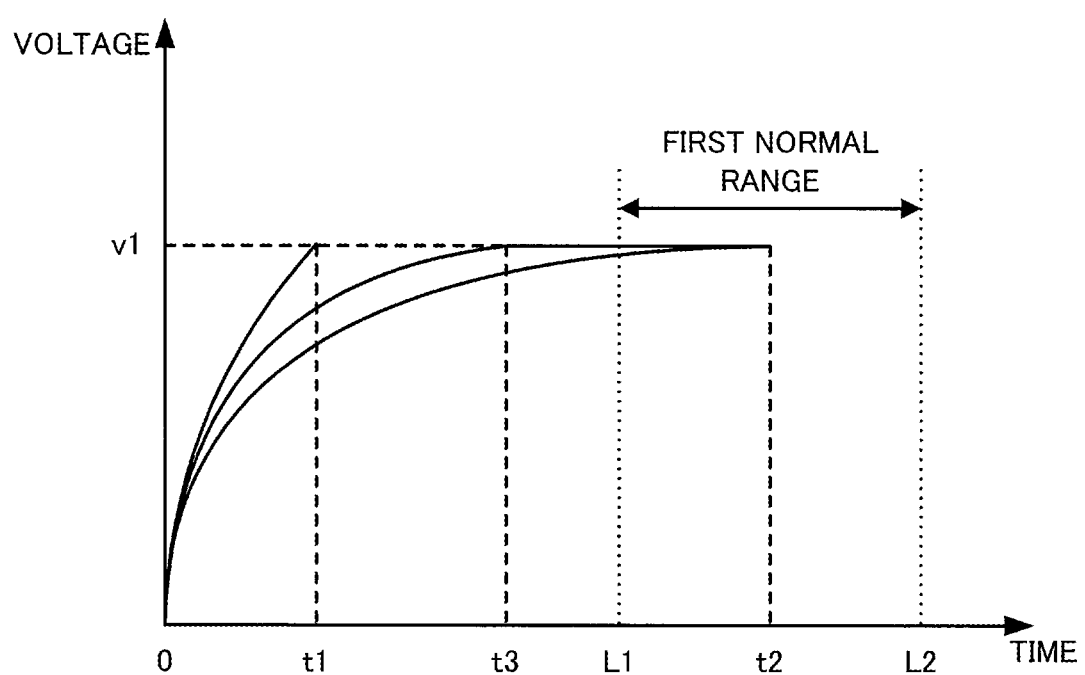
FIG. 8 is a first diagram illustrating changes in voltage in response to transmission of a test signal.

The following describes a diagnostic approach implemented by the transmitting/receiving unit 210a of the interface circuit 21a as an example. FIG. 8 is a first diagram illustrating changes in the voltage in response to transmission of a test signal. The voltage of FIG. 8 is the voltage of a differential signal detected by the detection circuit 213a when a test signal is transmitted from the Tx driver 211a of the transmitting/receiving unit 210a. In addition, the time origin (time=0) in FIG. 8 corresponds to when the voltage detected by the detection circuit 213a exceeds a predetermined lower threshold (i.e., the rise start time). Further, voltage v1 is an upper threshold used to determine the rise completion time. Note that these are the same for FIG. 9.

In FIG. 8, time t1 represents an example of a rise time of the test signal obtained when an interface circuit is not connected to the interface circuit 21a at the other endpoint. On the other hand, time t2 represents an example of a rise time of the test signal obtained when an interface circuit (in this example, the interface circuit 21b of FIG. 6) is connected to the interface circuit 21a at the other endpoint. When the other endpoint interface circuit 21b is connected, the termination resistors R1a and R2a of the interface circuit 21b are connected to the differential signal lines, which results in the test signal having a longer rise time.

Serial communication standards, such as PCIe and SAS, specify device detection procedures to determine, at link-up, whether an interface circuit is connected at the other endpoint based on such a difference in rise time of the test signal attributed to the presence or absence of termination resistors. Such a detection procedure defines a rise time threshold based on specifications of a circuit, such as a termination resistor. Then, in the case where the detected rise time of the test signal at link-up is equal to or more than the threshold, an interface circuit is determined to be connected at the other endpoint. The interface circuit 21a of this embodiment also has such a device detection function.

In addition to the device detection function, the interface circuit 21a also has a function of diagnosing the occurrence of an abnormality in a lane in the case where an interface circuit is determined to be connected at the other endpoint. In this diagnosis, the control circuit 220a of the interface circuit 21a determines whether the rise time of the test signal detected at link-up falls within a range from time L1 to time L2 (hereinafter referred to as the "first normal range"). If the detected rise time falls within the first normal range, the control circuit 220a determines that the lane is normal. On the other hand, if the detected rise time falls outside the first normal range, the control circuit 220 determines that the lane has an abnormality. For example, in the case where time t3 illustrated in FIG. 8 is detected as the rise time, the control circuit 220a determines that the lane has an abnormality because the time t3 falls outside the first normal range.

This diagnosis allows detection of an abnormal rise time attributed to an abnormality of some sort occurring in a device on the lane. In the case where an abnormal rise time is observed, normal signal transmission in the diagnosis target lane may fail. When an abnormality has been detected in this diagnosis, the occurrence of a communication abnormality would be prevented, for example, by performing communication without the use of the lane with an abnormality. Note that manufacturing variations in internal circuits (for example, serializer-deserializer (SERDES) circuits) of the transmitting/receiving unit 210a and the other endpoint transmitting/receiving unit 210e are found to be a cause of such an abnormal rise time.

As for the times L1 and L2 used as thresholds, predetermined values are employed separately for PCIe interfaces and SAS interfaces. The first normal range is set in such a manner as to include at least a normal rise time according to a standard concerned. In addition, the time L1 is a time point more than a threshold time used in the device detection procedure to determine that an interface circuit is connected at the other endpoint. Herewith, even when an interface circuit has been determined to be connected at the other endpoint, it is possible to determine whether the detected rise time is abnormal.

Figure 9:
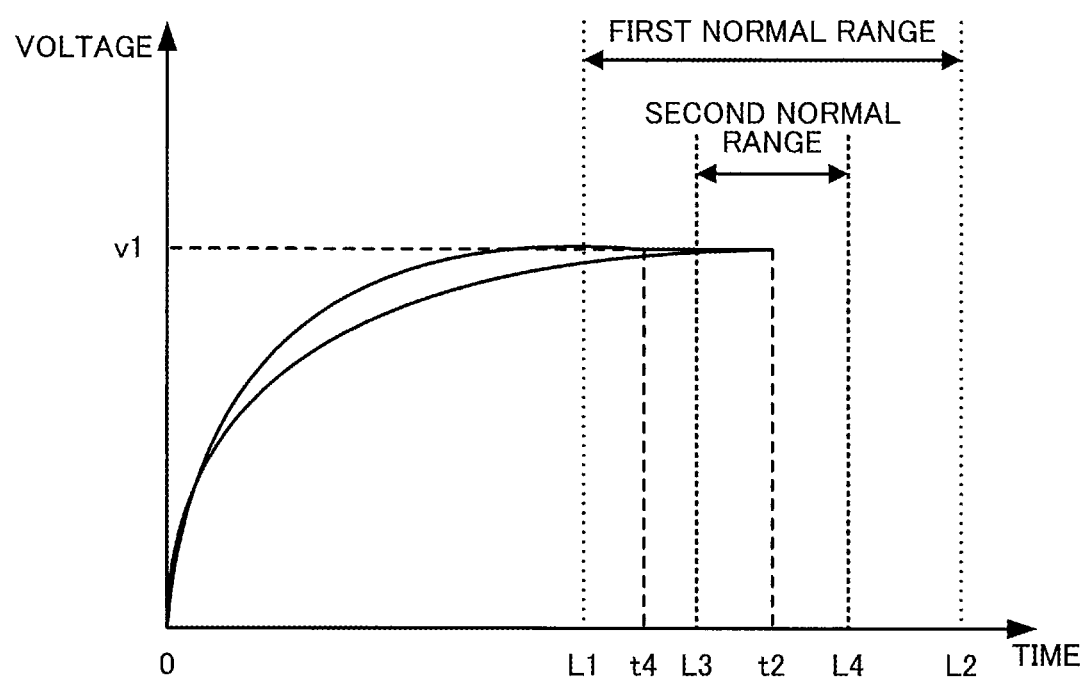
FIG. 9 is a second diagram illustrating the changes in voltage in response to transmission of the test signal.

FIG. 9 is a second diagram illustrating the changes in the voltage in response to transmission of a test signal. The diagnosis to detect an abnormality sign in a lane is explained with reference to FIG. 9. Capacitors on a lane like the AC coupling capacitors C1a, C2a, C1b, and C2b of FIG. 7 normally have a resistance value of about hundreds of megaohms (MΩ). However, if an abnormality such as a crack develops in such a capacitor, the resistance value gradually decreases. As the capacitor increasingly degrades with age and the severity of the abnormality becomes worse, the resistance value may be reduced to about hundreds of ohms.

The rise time of the differential signal is shortened with a decrease in the resistance value, which causes a high incidence of sudden link down during normal operation. In view of this problem, the interface circuit 21a transmits a test signal to each lane during normal operation and detects the rise time of the test signal. The control circuit 220a of the interface circuit 21a determines whether the detected rise time falls within a second normal range, which is narrower than the first normal range. If the detected rise time does not fall within the second normal range, the control circuit 220a determines that an abnormality sign is present in the lane.

The second normal range is set in the following manner. The control circuit 220a determines the second normal range with reference to the time t2 detected at link-up. Specifically, the control circuit 220a subtracts a predetermined value from the time t2 to obtain a lower limit time L3 of the second normal range. Then, the control circuit 220a adds the predetermined value to the time t2 to obtain an upper limit time L4 of the second normal range. Thus, setting the second normal range with reference to the time t2 detected at link-up facilitates estimating the progress of degradation of capacitors with age.

As described above, the second normal range is set to be narrower than the first normal range. This allows detection of a sign of an abnormality subsequently developing in a lane over time even if the lane is determined to have no abnormality at link-up and is capable of normal communication at the moment. Assume for example that a time t4 is detected as the rise time of the test signal in a diagnosis target lane during normal operation, as illustrated in FIG. 9. Because the time t4 falls within the first normal range, the diagnosis target lane is determined to have no abnormality at link-up, and is able to carry out normal communication at present. However, when the rise time is determined to fall outside the second normal range, the presence of an abnormality sign is detected, which raises an alert on the diagnosis target lane being at high risk for developing communication failure later.

Detection of such an abnormality sign allows the controller module 200a (or 200b) to implement a range of measures to reduce the effect of a communication abnormality in the lane possibly taking place later. For example, the controller module 200a stops communication on the lane in which an abnormality sign has been detected, to thereby prevent the occurrence of port link-down due to a communication failure on the lane. Alternatively, the controller module 200a issues an alert when an abnormality sign is detected to urge the user to replace components of the interface circuit or ones on the lane.

The above-described diagnosis to detect an abnormality sign is performed during normal operation. Conventional interface circuits are not capable of performing such diagnosis without stopping port communication during normal operation. On the other hand, serial communication standards, such as PCIe, define a power saving state ("L0s" state) in which communication on at least one of a plurality of serial transmission paths bundled together is shut down. In view of this, each interface circuit of this embodiment enables diagnosis on a diagnosis target lane while continuing communication on lanes other than the diagnosis target lane, by use of a state transition function of entering the L0s state and a switch for physically isolating the diagnosis target lane from the remaining lanes.

Figure 10:
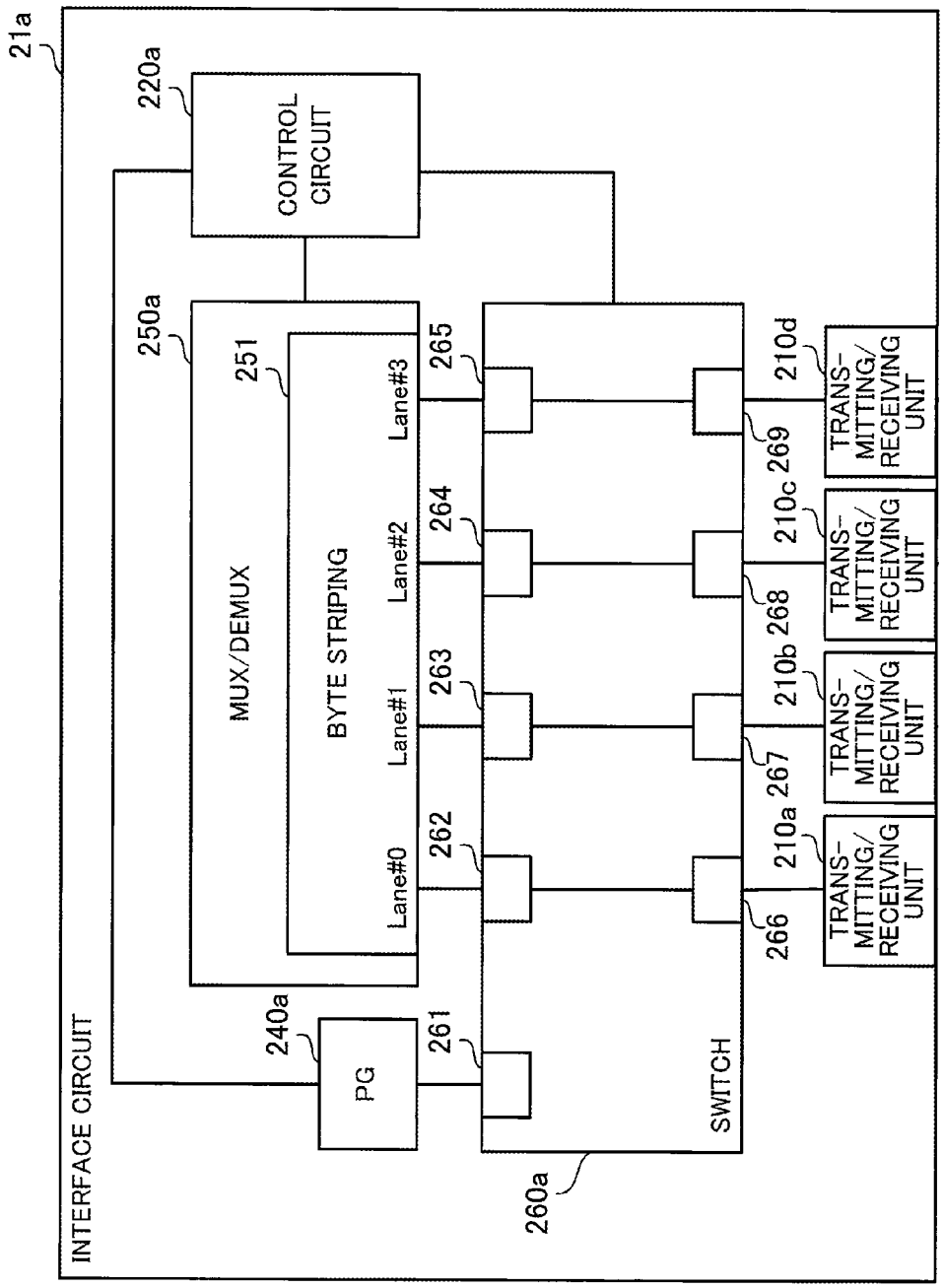
FIG. 10 illustrates a first example of switch connection status.

FIG. 10 illustrates a first example of switch connection status. First, a configuration example of the switch 260a and its peripheral components within the interface circuit 21a is described with reference to FIG. 10. The MUX/DEMUX 250a includes a byte striping 251. The byte striping 251 distributes transmission data across Lane#0 to Lane#3. Note here that Lane#0 to Lane#3 are lane identification numbers used according to a communication protocol. For example, when a driver exercising control over the interface circuit 21a makes a lane designation to the interface circuit 21a, the driver uses the identification numbers, Lane#0 to Lane#3.

The switch 260a includes input terminals 261 to 265 and output terminals 266 to 269. According to an instruction from the control circuit 220a, the switch 260a changes connection between the input terminals 261 to 265 and the output terminals 266 to 269. To the input terminal 261, a test signal from the pulse generator 240a is input. To the input terminals 262 to 265, data output from Lane#0 to Lane#3, respectively, of the byte striping 251 is input. Signals output from the output terminals 266 to 269 are input to the transmitting/receiving units 210a to 210d, respectively.

FIG. 10 depicts connection status of the switch 260a in the case where no diagnosis is being performed. In this status, the input terminals 262 to 265 are connected to the output terminals 266 to 269, respectively. In this case, data output from Lane#0 to Lane#3 of the byte striping 251 is output through the lanes 22a to 22d, respectively. In this status, communication is performed with the recognition of the lanes 22a to 22d as Lane#0 to Lane#3, respectively.

Figure 11:
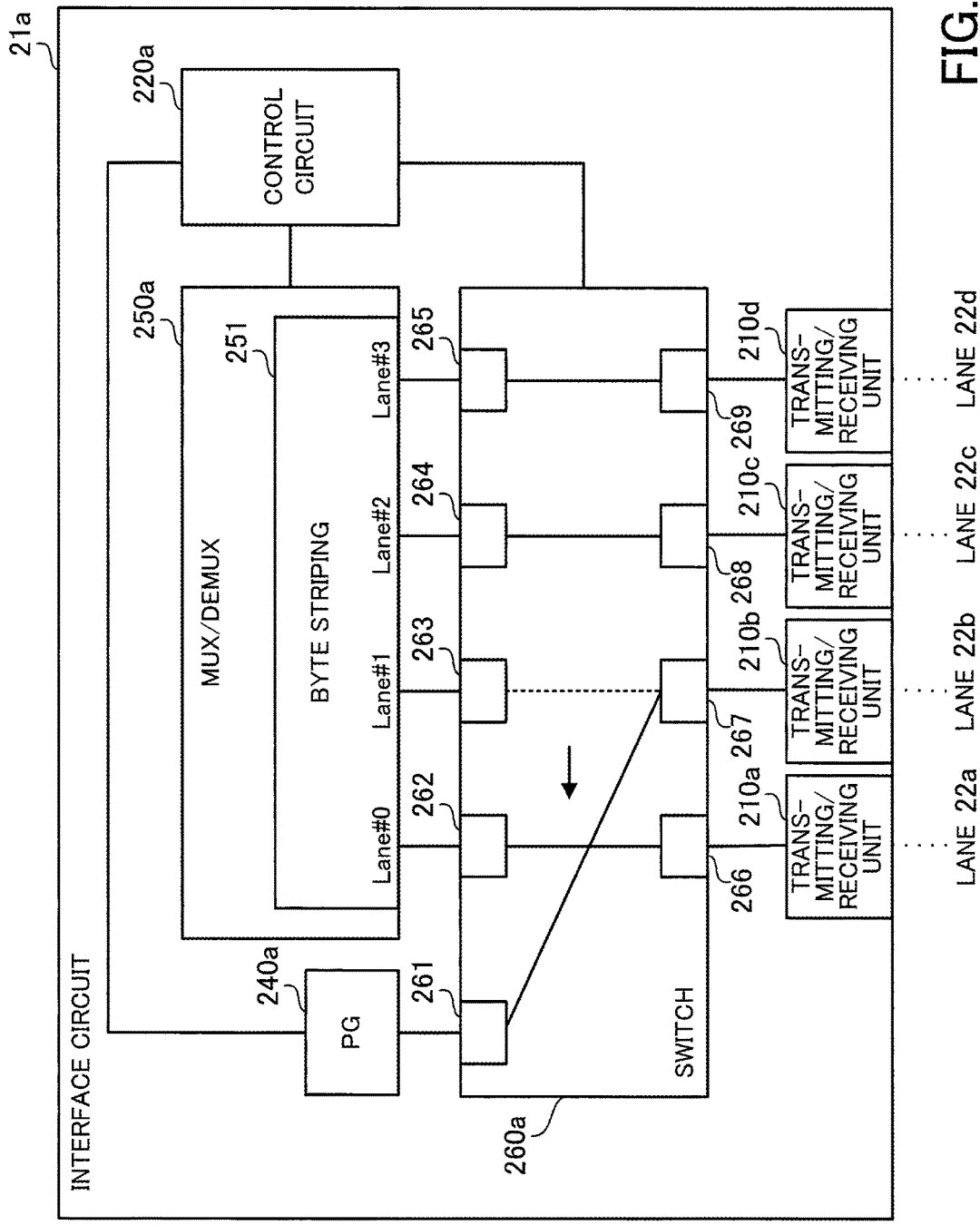
FIG. 11 is a second example of the switch connection status.

FIG. 11 is a second example of the switch connection status. FIG. 11 depicts connection status of the switch 260a in the case where the control circuit 220a has received an instruction of diagnosis on Lane#1. In this case, according to an instruction from the control circuit 220a, the switch 260a changes the connection of the output terminal 267 from the input terminal 263 to the input terminal 261. Herewith, it is possible to perform diagnosis on the lane 22b by supplying a test signal from the pulse generator 240a to the transmitting/receiving unit 210b while continuing data communication by use of the lanes 22a, 22c, and 22d.

In an actual process, the control circuit 220a causes the interface circuit 21a to enter a power saving state (the L0s state) with Lane#1 being idle from a normal operational state ("L0" state). This allows the interface circuit 21a to continue communication by use of the remaining Lane#0, Lane#2, and Lane#3 without change of the communication protocol. Then, after the state transition is completed, the control circuit 220a instructs the switch 260a to change the connection of the output terminal 267 from the input terminal 263 to the input terminal 261. When the change is completed, the control circuit 220a causes the pulse generator 240a to output a test signal. Herewith, it is possible to perform diagnosis on the lane 22b which has been associated with Lane#1 not currently in use for communication.

Figure 12:
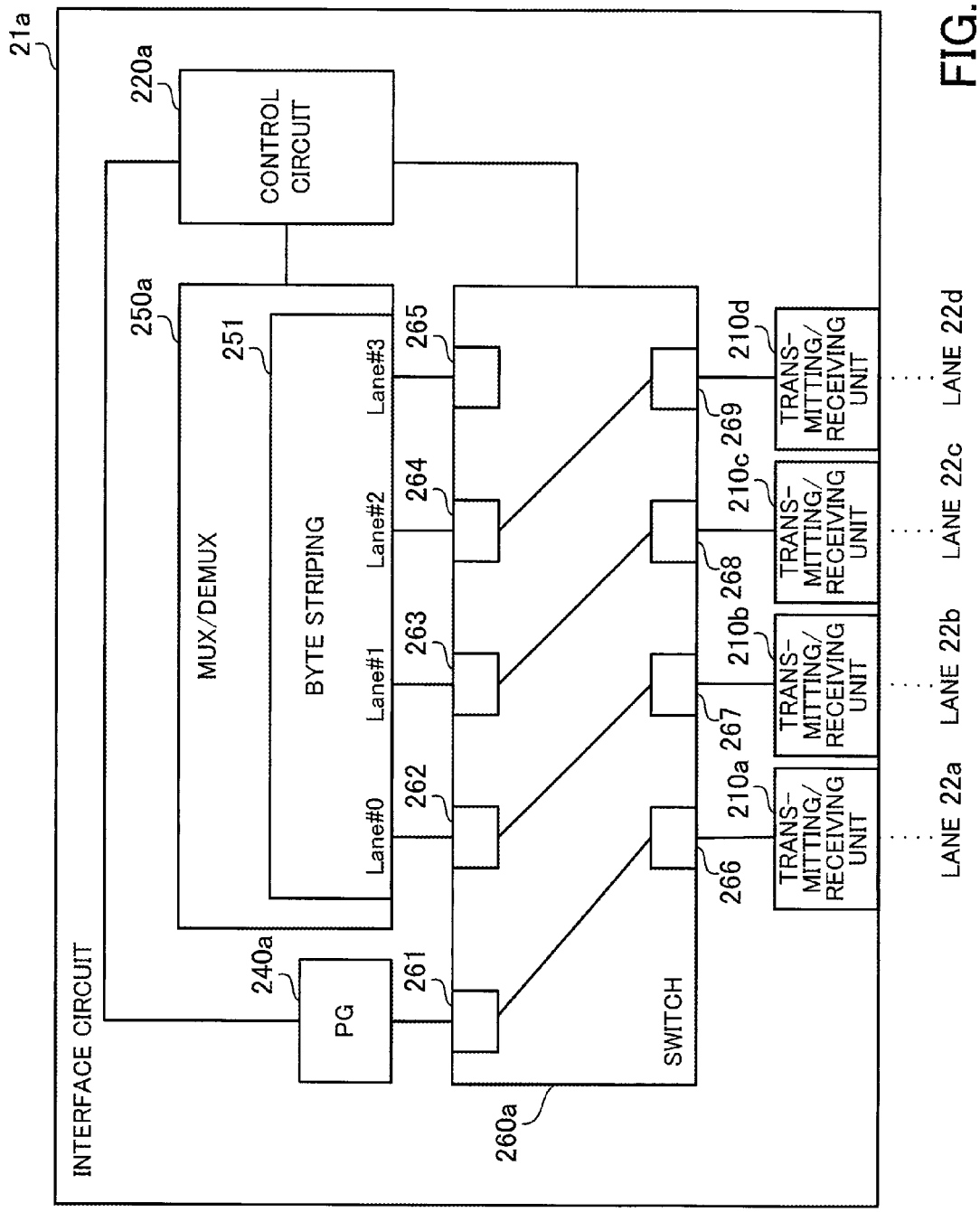
FIG. 12 is a third example of the switch connection status.

FIG. 12 is a third example of the switch connection status. FIG. 12 depicts connection status of the switch 260a in the case where the control circuit 220a has received an instruction of diagnosis on Lane#0. In this case, the diagnosis target lane is the lane 22a associated with Lane#0. Note that, according to the PCIe standard, communication is not possible without using Lane#0 which is a main lane. Therefore, the control circuit 220a instructs the switch 260a to change the connection of Lane#0 from the diagnosis target lane 22a to a different lane. Herewith, it is possible to perform diagnosis on the diagnosis target lane which was associated with Lane#0 until then while continuing communication on Lane#0.

Specifically, under the control of the control circuit 220a, connection changes are made in such a manner to obtain, for example, the switch connection status illustrated in FIG. 12. First, the control circuit 220a causes the interface circuit 21a to enter the power saving state (the L0s state) with Lane#3 being idle so that Lane#3 is not used for communication. Then, the connection of the input terminal 262 connected to Lane#0 is changed from the output terminal 266 connected to the diagnosis target lane 22a to a different output terminal (in this example, the output terminal 267). Along with this connection change, the connections of the input terminals 263 and 264 are also changed to the output terminals 268 and 269, respectively. Herewith, it is possible to continue communication with the recognition of lanes 22b to 22d as Lane#0 to Lane#2, respectively. Subsequently, the input terminal 261 is connected to the output terminal 266 so that a test signal output from the pulse generator 240a is transmitted to the transmitting/receiving unit 210a to perform diagnosis on the lane 22a. Under the above-described control, it is possible to perform diagnosis on the diagnosis target lane which was previously associated with Lane#0 while continuing communication using Lane#0 without change of the communication protocol.

Figure 13:
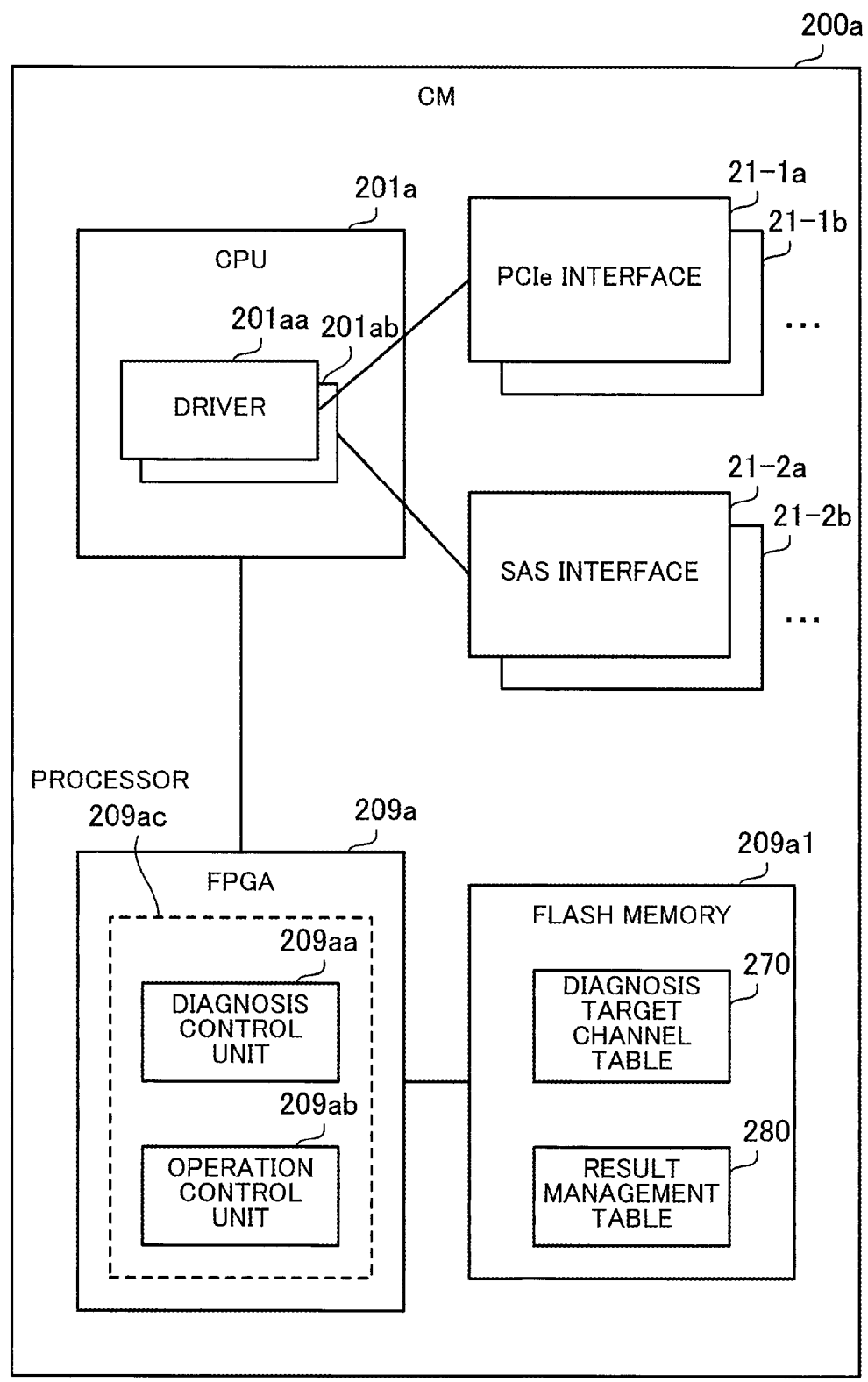
FIG. 13 is a block diagram illustrating a configuration example of processing functions of a controller module.

FIG. 13 is a block diagram illustrating a configuration example of processing functions of a controller module. The example of FIG. 13 depicts processing functions of the controller module 200a. The controller module 200a includes a diagnosis control unit 209aa, an operation control unit 209ab, and drivers 201aa and 201ab. The diagnosis control unit 209aa and the operation control unit 209ab are implemented by the FPGA 209a, and the drivers 201aa and 201ab are implemented by the CPU 201a. For example, in the case where the FPGA 209a includes a processor 209ac capable of executing programs, processes performed by the diagnosis control unit 209aa and the operation control unit 209ab are implemented by the processor 209ac executing a predetermined firmware program. In addition, processes performed by the drivers 201aa and 201ab are implemented by the CPU 201a executing a predetermined firmware program.

In addition, the flash memory 209a1 stores therein a diagnosis target channel table 270 and result management tables 280 as information referenced during the execution of processes by the FPGA 209a. The diagnosis target channel table 270 registers information indicating interface circuits within the storage device 100 and the sequence of lane diagnosis. The result management tables 280 register diagnostic results for individual interface circuits and information indicating usage status of each lane. Note that one result management table 280 is created for each pair of interface circuits connected to each other via serial transmission paths.

The diagnosis control unit 209aa determines diagnosis target interface circuits and lanes based on the diagnosis target channel table 270. The diagnosis control unit 209aa instructs, via either the driver 201aa or 201ab, the diagnosis target interface circuits to start diagnosis with designation of the diagnosis target lanes. The operation control unit 209ab receives a diagnostic result via either the driver 201aa or 201ab and registers the diagnostic result in the corresponding result management table 280. In addition, based on diagnostic results for the entire storage device 100, registered in the result management tables 280, the operation control unit 209ab controls the use or non-use of individual lanes of each interface circuit via either the driver 201aa or 201ab.

The driver 201aa controls communication and diagnostic operations in PCIe interfaces 21-1a, 21-1b, and so on amongst interface circuits within the storage device 100. As for the control of diagnostic operations, the driver 201aa receives a diagnosis start instruction with designation of a diagnosis target lane from the diagnosis control unit 209aa, and transmits the received instruction to a corresponding PCIe interface. In addition, the driver 201aa transmits a diagnostic result received from a PCIe interface to the diagnosis control unit 209aa. Further, the driver 201aa controls the use or non-use of each lane of a PCIe interface according to an instruction from the operation control unit 209ab. The driver 201ab controls communication and diagnostic operations in SAS interfaces 21-2a, 21-2b, and so on amongst the interface circuits within the storage device 100. Because processes of the driver 201ab are the same as those performed by the driver 201aa on the PCIe interface 21-1a, 21-1b, and so on, repeated descriptions thereof are omitted.

Note that the controller module 200b also has the same processing functions as those of the controller module 200a of FIG. 13. As for the FPGA 209a of the controller module 200a and the FPGA 209b of the controller module 200b, for example, one of them operates as a master while the other operates as a slave. For example, if the FPGA 209a operates as a master, the diagnosis control unit 209aa and the operation control unit 209ab lead the diagnostic operations and the control of the use or non-use of individual lanes of each interface circuit. In addition, in the case of transmitting an instruction to an interface circuit of the other controller module 200b, for example, the instruction is transmitted from the FPGA 209a to the FPGA 209b and then transferred via a driver implemented by the CPU 201b to the interface circuit of the controller module 200b. In addition, information transmitted from an interface circuit to the FPGA 209b, such as a diagnostic result, is transferred through a route reverse to the above-described one.

FIG. 14 illustrates an example of the diagnosis target channel table. The diagnosis target channel table 270 is stored in the flash memory 209a1. The diagnosis target channel table 270 is information by which the sequence of lanes to be diagnosed is identifiable. The diagnostic sequence is determined by the diagnosis control unit 209aa of the FPGA 209a in consideration of access performance from the host device 400 to the device enclosure 300. How to determine the diagnostic sequence is described in detail later. The diagnosis target channel table 270 includes columns named "group" and "diagnosis target channel". Each field in the group column contains information for identifying a group. Each field in the diagnosis target channel column contains information on diagnosis target channel or channels.

Each diagnosis target channel corresponding to one group designates the location of a channel targeted for diagnosis by the names of individual devices each connected at either endpoint of the channel. Each field in the diagnosis target channel column contains at least one pair of the names of such devices. Each field in the diagnosis target channel column may also designate lane numbers indicating diagnosis targets on the corresponding channel. Each group registered in the diagnosis target channel table 270 is further divided into subgroups. For example, Group "1" is divided into Subgroups "1a" to "1d". The subgroups correspond one-to-one with lanes included in each channel registered in the diagnosis target channel field of the corresponding group. The diagnosis control unit 209aa determines lanes to be diagnosed with reference to the diagnosis target channel table 270. The diagnosis control unit 209aa sequentially determines the lanes to be diagnosed, starting with Group "1". In addition, the diagnosis control unit 209aa sequentially determines the lanes to be diagnosed, starting with Subgroup "1a" of Group "1".

For example, in the example of FIG. 14, "Lane#0 between CPU/CM#0 and IOC/CM#0" is registered in the diagnosis target channel field corresponding to Subgroup "1a". This indicates that Lane#0 of the channel connecting the CPU 201a and the IOC 205a of CM#0 (the controller module 200a) is designated as a diagnosis target. In this case, the diagnosis control unit 209aa transmits diagnosis start instructions associated with Lane#0 to interface circuits each connected at either endpoint of the corresponding channel via a driver (in this case, the driver 201aa). Each of the interface circuits performs diagnosis on the differential signal lines for transmission of Lane#0 and notifies the diagnosis control unit 209aa of the diagnostic result via the driver 201aa. In addition, in the example of FIG. 14, two channels "Lane#0 between CPU/CM#0 and IOC/CM#0" and "Lane#0 between IOC/CM#0 and SASExp/CM#0" (i.e., two lanes, each in a different channel) are registered in the diagnosis target channel field corresponding to Subgroup "1a". In this case, the diagnosis control unit 209aa performs diagnosis on the two channels in parallel.

FIG. 15 illustrates an example of the result management tables. Result management tables 280a, 280b, 280c, and so on are stored in the flash memory 209a1. Each of the result management tables 280a, 280b, 280c, and so on registers, with respect to each lane, a diagnostic result of a channel in a single direction between a pair of devices. For example, the result management table 280a includes diagnostic results for individual lanes of the channel identified by "CPU/CM#0→PCH/CM#0". That is, the result management table 280a registers the diagnostic result of each lane in the channel for transmission from the CPU 201a to the PCH 207a.

Each field in a column named "diagnostic result" contains one of the following: normal; abnormality sign; and abnormal. "Normal" indicates that the corresponding diagnosis target lane is normal. "Abnormality sign" indicates that an abnormality sign is present in the corresponding diagnosis target lane. "Abnormal" indicates that there is an abnormality in the corresponding diagnosis target lane. Further, each result management table registers a use flag and the times L3 and L4 with respect to each lane. Each field in the use flag column contains a flag indicating whether to use the corresponding lane (the lane to be enabled) or not to use the lane and shut it down. In the case of using the lane, "true" is registered. In the case of not using the lane, "false" is registered. The times L3 and L4 indicate the lower and upper limits, respectively, of the second normal range used in diagnosis to detect an abnormality sign.

Figure 16:
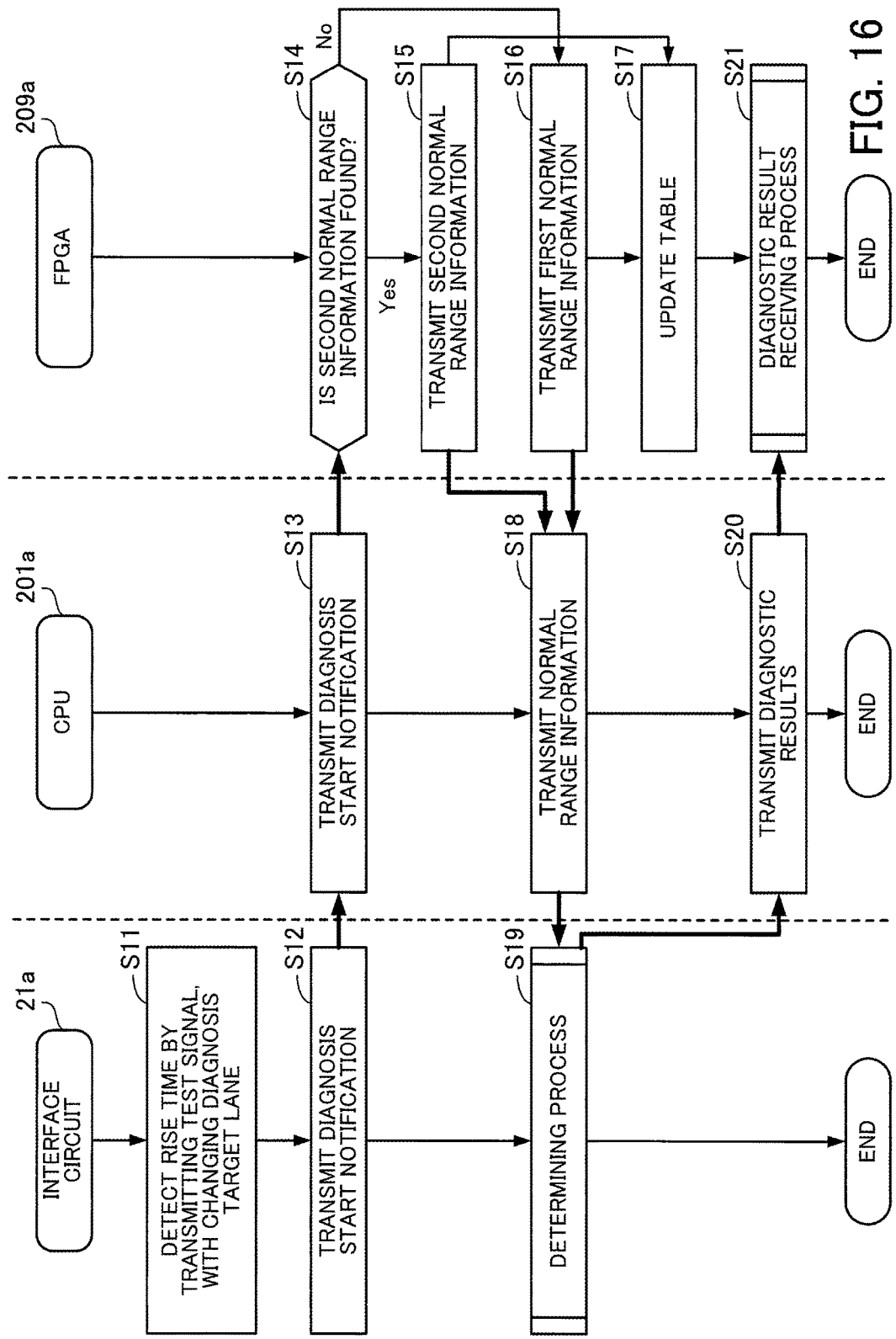
FIG. 16 is a flowchart illustrating an example of a diagnostic process at link-up.

A diagnostic process carried out at link-up is described next with reference to a flowchart. FIG. 16 is a flowchart illustrating an example of the diagnostic process at link-up. The process of FIG. 16 is described according to the step numbers in the flowchart.

[Step S11] Step S11 is executed, for example, when the interface circuit 21a has started with the storage device 100 being powered on, or when the interface circuit 21a has been reset and restarted. The control circuit 220a of the interface circuit 21a performs a process of detecting the rise time of a test signal with changing the diagnosis target lane.

Specifically, the control circuit 220a determines a diagnosis target lane. The control circuit 220a causes the switch 260a to perform connection line switching so as to connect the input terminal 261 connected to the pulse generator 240a to the output terminal connected to the diagnosis target lane. Then, the control circuit 220a causes the pulse generator 240a to transmit a test signal. The detection circuit 213a detects the rise time of the test signal in the diagnosis target lane, and notifies the control circuit 220a of the detected rise time. When detecting, based on the detected rise time, that the interface circuit 21b has been connected at the other endpoint, the control circuit 220a stores the detected rise time in the memory 230a, in association with the number of the diagnosis target lane.

The interface circuit 21a performs the above-described process on each of all the lanes of a port concerned, and detects the rise time for each lane and stores the detected rise time in the memory 230a. Note that, in the case where the control circuit 220a determines that an interface circuit is not connected at the other endpoint, step S12 and the subsequent steps are not executed.

[Step S12] The control circuit 220a of the interface circuit 21a transmits diagnosis start notification to the CPU 201a.

[Step S13] A driver (the driver 201aa, for example) of the CPU 201a transmits the diagnosis start notification to the FPGA 209a.

[Step S14] The diagnosis control unit 209aa of the FPGA 209a refers to the flash memory 209a1 to determine whether information on the second normal range (i.e., the times L3 and L4) corresponding to the interface circuit 21a, which is the source of the diagnosis start notification (hereinafter simply referred to as the "notification-source interface circuit 21a"), is stored. This determination is made, for example, by checking whether the result management table 280 corresponding to the notification-source interface circuit 21a is stored in the flash memory 209a1. When the corresponding result management table 280 is stored, the second normal range information is found in the stored result management table 280. If the result management table 280 is stored, the diagnosis control unit 209aa moves to step S15. If not, the diagnosis control unit 209aa moves to step S16.

Note here that, for example, if the notification-source interface circuit 21a is newly installed, no second normal range information corresponding to the interface circuit 21a is found. Also if an interface circuit installed at the same location has been replaced with the notification-source interface circuit 21a, no second normal range information corresponding to the interface circuit 21a is found.

[Step S15] The diagnosis control unit 209aa acquires the second normal range information (the times L3 and L4) for each lane from the result management table 280 referenced in step S14. The diagnosis control unit 209aa transmits, to the CPU 201a, the second normal range information together with an abnormality sign diagnosis start instruction, and instructs the CPU 201a to transmit the information with the instruction to the notification-source interface circuit 21a.

[Step S16] The diagnosis control unit 209aa acquires information on the first normal range (the times L1 and L2) pre-stored in the flash memory 209a1. The diagnosis control unit 209aa transmits, to the CPU 201a, the first normal range information together with an abnormality diagnosis start instruction, and instructs the CPU 201a to transmit the information with the instruction to the notification-source interface circuit 21a.

Note that, because the times L1 and L2 indicating the first normal range are fixed values, they need not be pre-stored in the memory 230a. If this is the case, the first normal range information need not be transmitted in step S16.

[Step S17] The diagnosis control unit 209aa updates the diagnosis target channel table 270 in response to the interface circuit 21a being newly installed. Specifically, the diagnosis control unit 209aa updates the diagnosis target channel table 270 according to the following rules (1) to (3) in consideration of access performance from the host device 400 to the device enclosure 300. Note that the order of priority is (1)>(2)>(3).

(1) The diagnosis control unit 209aa determines locations of channels to be diagnosed at the same time in such a manner that no significant difference arises in the data flow rate between the upstream and the downstream. For example, the lane count at the upstream of the IOC 205a, i.e., the number of lanes between the CPU 201a and the IOC 205a, is 8. On the other hand, the lane count between the IOC 205a and the SAS expander 206a is 4, and the lane count between the IOC 205a and the SAS expander 206b is 4. Therefore, the total lane count at the downstream of the IOC 205a is 8. In this case, because the upstream lane count and the downstream lane count are the same, there is no difference in the data flow rate between the upstream and the downstream even when one lane each at both the upstream and the downstream undergoes diagnosis. Therefore, the diagnosis control unit 209aa registers, for example, four lanes between the CPU 201a and the IOC 205a and the four lanes between the IOC 205a and the SAS expander 206a as a single group to be diagnosed at the same time. In addition, the diagnosis control unit 209aa registers the remaining four lanes between the CPU 201a and the IOC 205a and the four lanes between the IOC 205a and the SAS expander 206b as a different single group to be diagnosed at the same time. Thus, selecting diagnosis target lanes in such a manner that there is little difference in the data flow rate between the upstream and the downstream decreases the possibility that communication will become stagnant in some parts within the storage device 100, which will result in decreased access performance to the device enclosure 300.

Note that, in the example above, the combination of lanes to be diagnosed at the same time is determined in such a manner that the number of lanes used for communication between the CPU 201a and the IOC 205a is the same as the number of lanes used for communication between the IOC 205a and the SAS expander 206a or 206b. However, as another example, this combination may be determined in such a manner that a difference between the number of lanes used for communication between the CPU 201a and the IOC 205a and the number of lanes used for communication between the IOC 205a and the SAS expander 206a or 206b is equal to or less than a certain value. Alternatively, this combination may be determined in such a manner that the ratio of the number of lanes used for communication between the CPU 201a and the IOC 205a to the number of lanes used for communication between the IOC 205a and the SAS expander 206a or 206b falls within a certain range.

(2) The diagnosis control unit 209aa makes the grouping in such a manner that diagnosis is performed on a large number of lanes at the same time provided that the impact on access performance to the device enclosure 300 is kept small. For example, the lane counts at the upstream and downstream of the IOC 205a are both 8, as mentioned above, which are relatively large numbers. Therefore, setting one lane each at the upstream and downstream as diagnosis targets causes a relatively small decrease in access performance to the device enclosure 300. In view of this, the diagnosis control unit 209aa sets a group in such a manner that one lane each at the upstream and downstream of the IOC 205a undergo diagnosis at the same time.

(3) The diagnosis control unit 209aa determines the sequence of lane diagnosis in such a manner as to preferentially diagnose channels in the controller module 200a and subsequently diagnose channels in the controller module 200b. This allows, even during the diagnosis, one of the controller modules 200a and 200b to operate while maintaining access performance.

In addition to updating the diagnosis target channel table 270 described above, the diagnosis control unit 209aa also creates the result management table 280 corresponding to the newly installed interface circuit 21a and stores it in the flash memory 209a1.

[Step S18] The driver 201aa of the CPU 201a transmits the information received from the FPGA 209a in step S15 or S16 to the interface circuit 21a.

[Step S19] The control circuit 220a of the interface circuit 21a stores, in the memory 230a, the first or second normal range information received from the CPU 201a. In the case of receiving an abnormality diagnosis start instruction, the control circuit 220a determines, with respect to each of the diagnosis target lanes, whether the rise time detected in step S11 falls within the received first normal range, to thereby determine the presence or absence of an abnormality in the lane. Herewith, abnormality diagnosis for each lane is performed. On the other hand, in the case of receiving an abnormality sign diagnosis start instruction, the control circuit 220a determines, with respect to each of the diagnosis target lanes, whether the rise time detected in step S11 falls within the received second normal range, to thereby determine the presence or absence of an abnormality sign in the lane. Herewith, abnormality sign diagnosis for each lane is performed. The control circuit 220a transmits diagnostic results to the CPU 201a.

[Step S20] The driver 201aa of the CPU 201a transmits the received diagnostic results to the FPGA 209a.

[Step S21] The operation control unit 209ab of the FPGA 209a carries out a diagnostic result receiving process. In this process, the operation control unit 209ab registers the received diagnostic results in the result management table 280 corresponding to the interface circuit 21a, which is the source of the diagnostic results. In addition, if an abnormality has been detected in one or more lanes, the operation control unit 209ab carries out an abnormality handling process to control which lanes of the interface circuit 21a to be used and which lanes to be shut down. Note that the diagnostic result receiving process is described in detail later with reference to FIG. 19.

Figure 17:
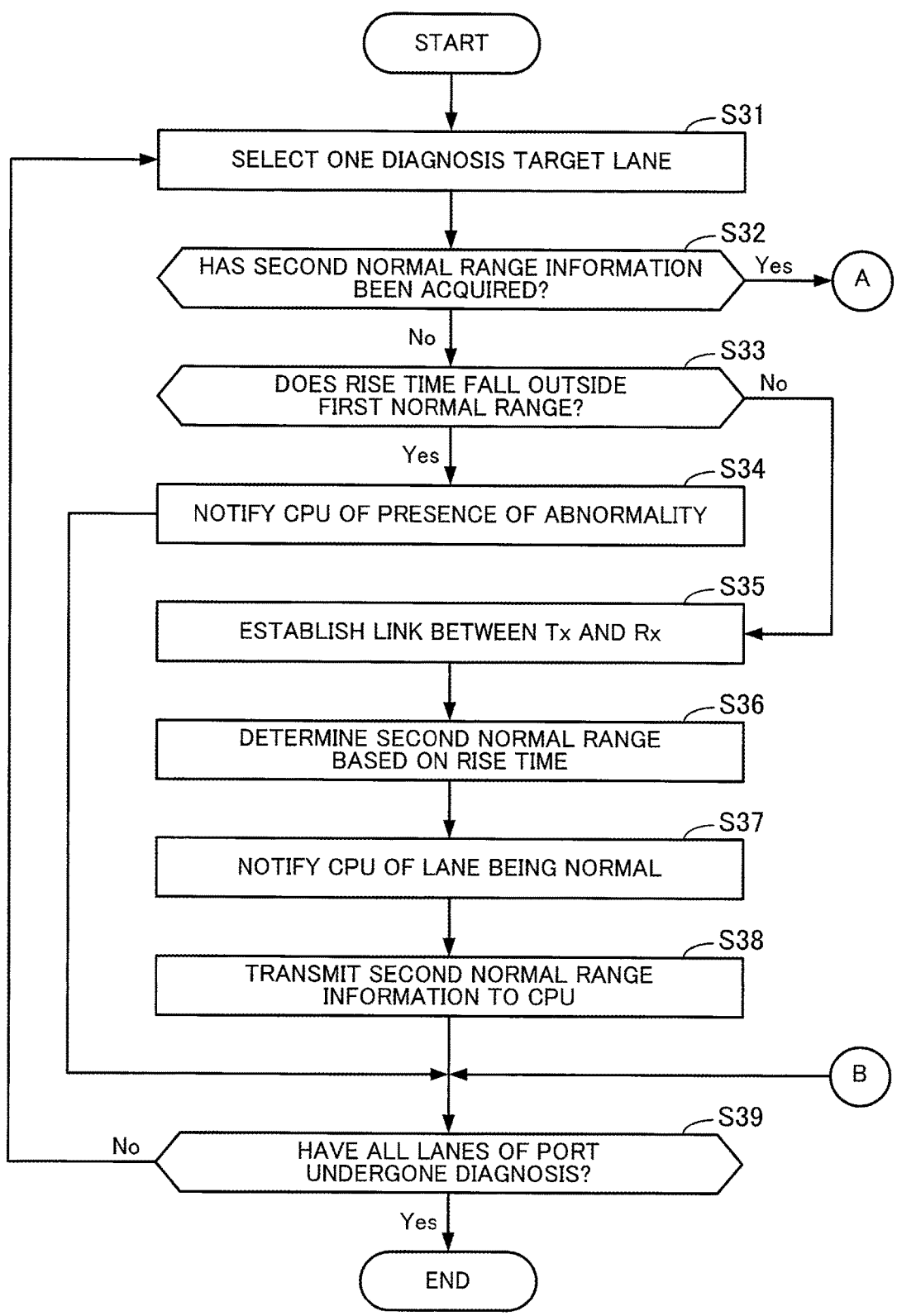
FIG. 17 is a first flowchart illustrating an example of a determining process.

FIG. 17 is a first flowchart illustrating an example of the determining process. The process of FIG. 17 corresponds to step S19 of FIG. 16. The process of FIG. 17 is described according to the step numbers in the flowchart.

[Step S31] The control circuit 220a selects one diagnosis target lane amongst a plurality of lanes of the port. The control circuit 220a acquires the rise time detected for the diagnosis target lane from the memory 230a.

[Step S32] The control circuit 220a determines whether to have acquired the second normal range information from the FPGA 209a. If having acquired the second normal range information, the control circuit 220a moves to step S41. If having acquired no second normal range information (that is, if having received the first normal range information), the control circuit 220a moves to step S33.

[Step S33] The control circuit 220a determines whether the rise time acquired in step S31 falls outside the first normal range notified by the FPGA 209a. If the rise time falls outside the first normal range, the control circuit 220a moves to step S34. If the rise time falls within the first normal range, the control circuit 220a moves to step S35.

[Step S34] The control circuit 220a notifies the CPU 201a that there is an abnormality in the diagnosis target lane. Then, the control circuit 220a moves to step S39.

Upon receiving the notification, the CPU 201a notifies the FPGA 209a that there is an abnormality in the diagnosis target lane.

[Step S35] According to an instruction from the control circuit 220a, the transmitting/receiving unit 210 establishes a link between transmission (Tx) and reception (Rx) of the diagnosis target lane.

[Step S36] The control circuit 220a determines the second normal range based on the rise time by the procedure described in FIG. 9.

[Step S37] The control circuit 220a notifies the CPU 201a that the diagnosis target lane is normal. Upon receiving the notification, the CPU 201a notifies the FPGA 209a that the diagnosis target lane is normal.

[Step S38] The control circuit 220a transmits the second normal range information (the times L3 and L4) to the CPU 201a. The CPU 201a notifies the FPGA 209a of the second normal range information.

[Step S39] The control circuit 220a determines whether all lanes of the port have undergone diagnosis. If all the lanes have undergone diagnosis, the determining process ends. If one or more lanes of the port remain undiagnosed, the control circuit 220a moves to step S31.

Figure 18:
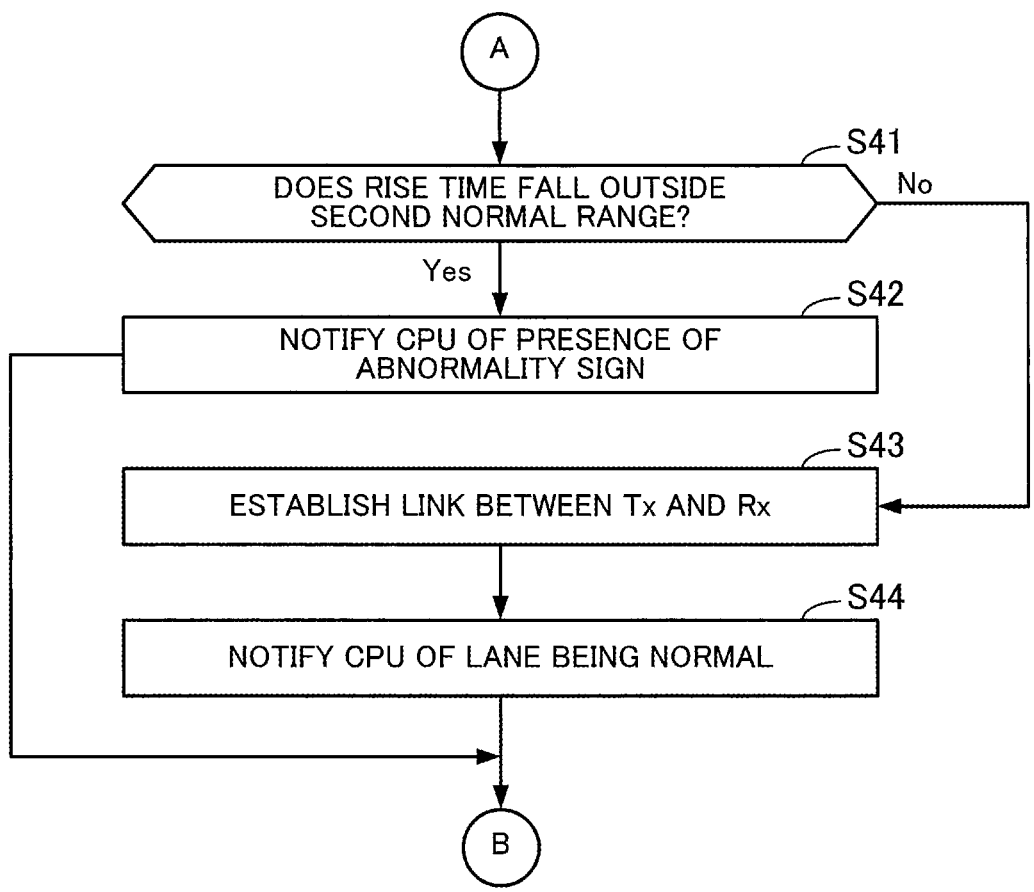
FIG. 18 is a second flowchart illustrating the example of the determining process.

FIG. 18 is a second flowchart illustrating the example of the determining process. The process of FIG. 18 is described according to the step numbers in the flowchart.

[Step S41] The control circuit 220a determines whether the rise time acquired in step S31 falls outside the second normal range notified by the FPGA 209a. If the rise time falls outside the second normal range, the control circuit 220a moves to step S42. If the rise time falls within the second normal range, the control circuit 220a moves to step S43.

[Step S42] The control circuit 220a notifies the CPU 201a that an abnormality sign is present in the diagnosis target lane. Then, the control circuit 220a moves to step S39. Upon receiving the notification, the CPU 201a notifies the FPGA 209a that an abnormality sign is present in the diagnosis target lane.

[Step S43] According to an instruction from the control circuit 220a, the transmitting/receiving unit 210 establishes a link between Tx and Rx of the diagnosis target lane.

[Step S44] The control circuit 220a notifies the CPU 201a that the diagnosis target lane is normal. Then, the control circuit 220a moves to step S39. Upon receiving the notification, the CPU 201a notifies the FPGA 209a that the diagnosis target lane is normal.

Thus, the interface circuit 21a is able to detect lanes with an abnormality or abnormality sign in the diagnostic process at link-up.

Figure 19:
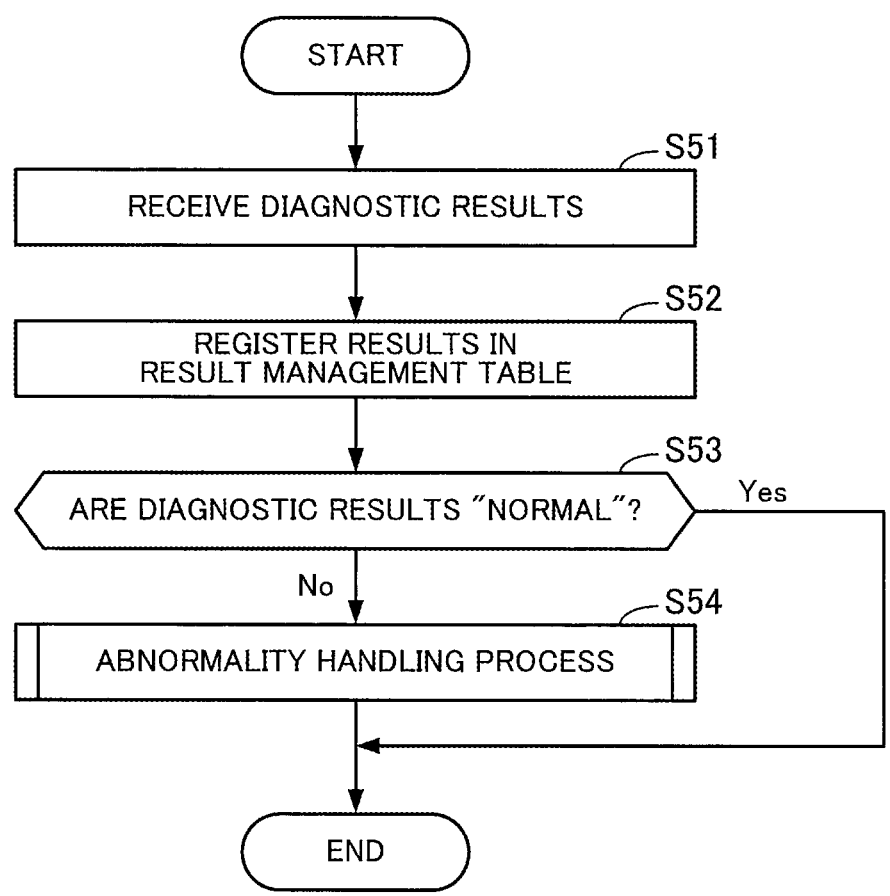
FIG. 19 is a flowchart illustrating an example of a diagnostic result receiving process.

FIG. 19 is a flowchart illustrating an example of the diagnostic result receiving process. The process of FIG. 19 corresponds to step S21 of FIG. 16. The process of FIG. 19 is described according to the step numbers in the flowchart.

[Step S51] The operation control unit 209ab of the FPGA 209a receives, from the CPU 201a, diagnostic results of the individual lanes of the interface circuit 21a. In addition to the diagnostic results, the operation control unit 209ab may also receive the second normal range information for each lane.

[Step S52] The operation control unit 209ab registers the diagnostic results of the individual lanes in the result management table 280 corresponding to the interface circuit 21a which conducted the diagnosis.

[Step S53] The operation control unit 209ab determines whether the diagnostic results of all the lanes are "normal". If there is a lane whose diagnostic result is "abnormal", the operation control unit 209ab moves to step S54. On the other hand, if the diagnostic results of all the lanes are "normal", the operation control unit 209ab registers, within the result management table 280, "true" in the use flag field corresponding to each of the lanes. In addition, in the case of having received the second normal range information of the individual lanes, the operation control unit 209ab registers, within the result management table 280, the information in the times L3 and L4 field corresponding to each of the lanes. Then, the operation control unit 209ab ends the diagnostic result receiving process.

[Step S54] The operation control unit 209ab carries out an abnormality handling process. This process is described in detail later with reference to FIGS. 23 and 24.

Note that, after step S51 or S52, for example, the operation control unit 209ab may instruct the CPU 201a to notify an external device (for example, the host device 400 or a management terminal of the storage device 100) of the diagnostic results. In this case, upon receiving the instruction, the CPU 201a causes the external device to display, for example, display information representing diagnostic content. Herewith, by visually perceiving the display information, the user is able to understand whether an abnormality or abnormality sign has been detected, and if so, which lane of which device the abnormality or abnormality sign has been detected from.

Figure 20:
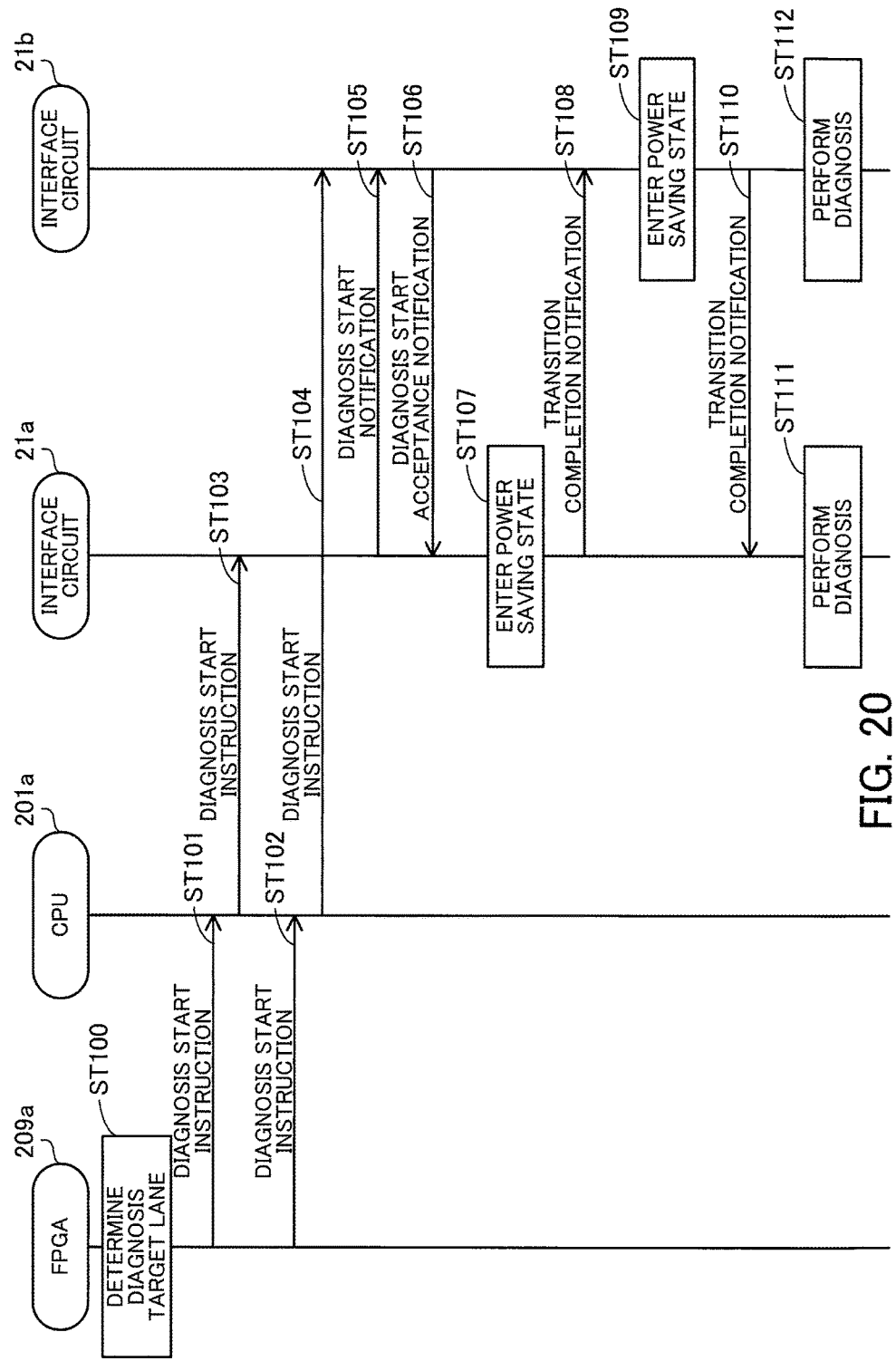
FIG. 20 is a first sequence diagram illustrating an example of a diagnosis control process during normal operation.

Next described is the diagnostic process during normal operation, with reference to sequence diagrams and a flowchart. Normal operation is a condition where access processing to the device enclosure 300 according to a request from the host device 400 is in progress within the storage device 100. FIG. 20 is a first sequence diagram illustrating an example of a diagnosis control process during normal operation. The process of FIG. 20 is described according to the step numbers in the flowchart.

[Step ST100] The diagnosis control unit 209aa of the FPGA 209a determines a diagnosis target lane with reference to the diagnosis target channel table 270. Assume here that one lane included in the channel between the interface circuits 21a and 21b is determined as the diagnosis target lane.

[Step ST101] The diagnosis control unit 209aa of the FPGA 209a transmits, to the CPU 201a, a diagnosis start instruction for the diagnosis target lane. This diagnosis start instruction includes identification information of a device connected at one endpoint of the diagnosis target lane or the interface circuit 21*a* and the number of the diagnosis target lane.

[Step ST102] The diagnosis control unit 209*aa* of the FPGA 209*a* transmits, to the CPU 201*a*, a diagnosis start instruction for the diagnosis target lane. This diagnosis start instruction includes identification information of a device connected at the other endpoint of the diagnosis target lane or the interface circuit 21*b* and the number of the diagnosis target lane. Note that the number of the diagnosis target lane is the same as that in step ST101.

Steps ST101 and ST102 above are executed each time the diagnosis control unit 209*aa* selects a subgroup in the diagnosis target channel table 270 sequentially from the top. In this regard, in the case where a plurality of lanes are registered in the selected subgroup, steps ST101 and ST102 and the subsequent steps are executed for each of the registered lanes. This enables parallel diagnosis on the registered lanes.

[Step ST103] A driver (the driver 201*aa*, for example) of the CPU 201*a* transmits a diagnosis start instruction to the interface circuit 21*a*, which is designated in the diagnosis start instruction transmitted in step ST101. This diagnosis start instruction includes the number of the diagnosis target lane.

[Step ST104] The driver 201*aa* of the CPU 201*a* transmits a diagnosis start instruction to the interface circuit 21*b*, which is designated in the diagnosis start instruction transmitted in step ST102. This diagnosis start instruction includes the number of the diagnosis target lane.

[Step ST105] The interface circuit 21*a* transmits diagnosis start notification to the interface circuit 21*b*.

[Step ST106] The interface circuit 21*b* transmits diagnosis start acceptance notification to the interface circuit 21*a*.

[Step ST107] The interface circuit 21*a* enters the power saving state (the L0s state) with the diagnosis target lane being idle. Note that in the case where the main lane (Lane#0) is designated as the diagnosis target lane, the interface circuit 21*a* causes a predetermined lane (Lane#3 in the example of FIG. 12) other than Lane#0 to go idle.

[Step ST108] The interface circuit 21*a* transmits, to the interface circuit 21*b*, transition completion notification indicating the completion of the transition to the power saving state. Note that in the case where Lane#0 is designated as the diagnosis target lane, a predetermined lane other than Lane#0 is brought to idle, as in step ST107.

[Step ST109] The interface circuit 21*b* enters the power saving state (the L0s state) with the diagnosis target lane being idle.

[Step ST110] The interface circuit 21*b* transmits, to the interface circuit 21*a*, transition completion notification indicating the completion of the transition to the power saving state.

[Step ST111] The interface circuit 21*a* performs abnormality sign diagnosis on the diagnosis target lane.

[Step ST112] The interface circuit 21*b* performs abnormality sign diagnosis on the diagnosis target lane.

Figure 21:
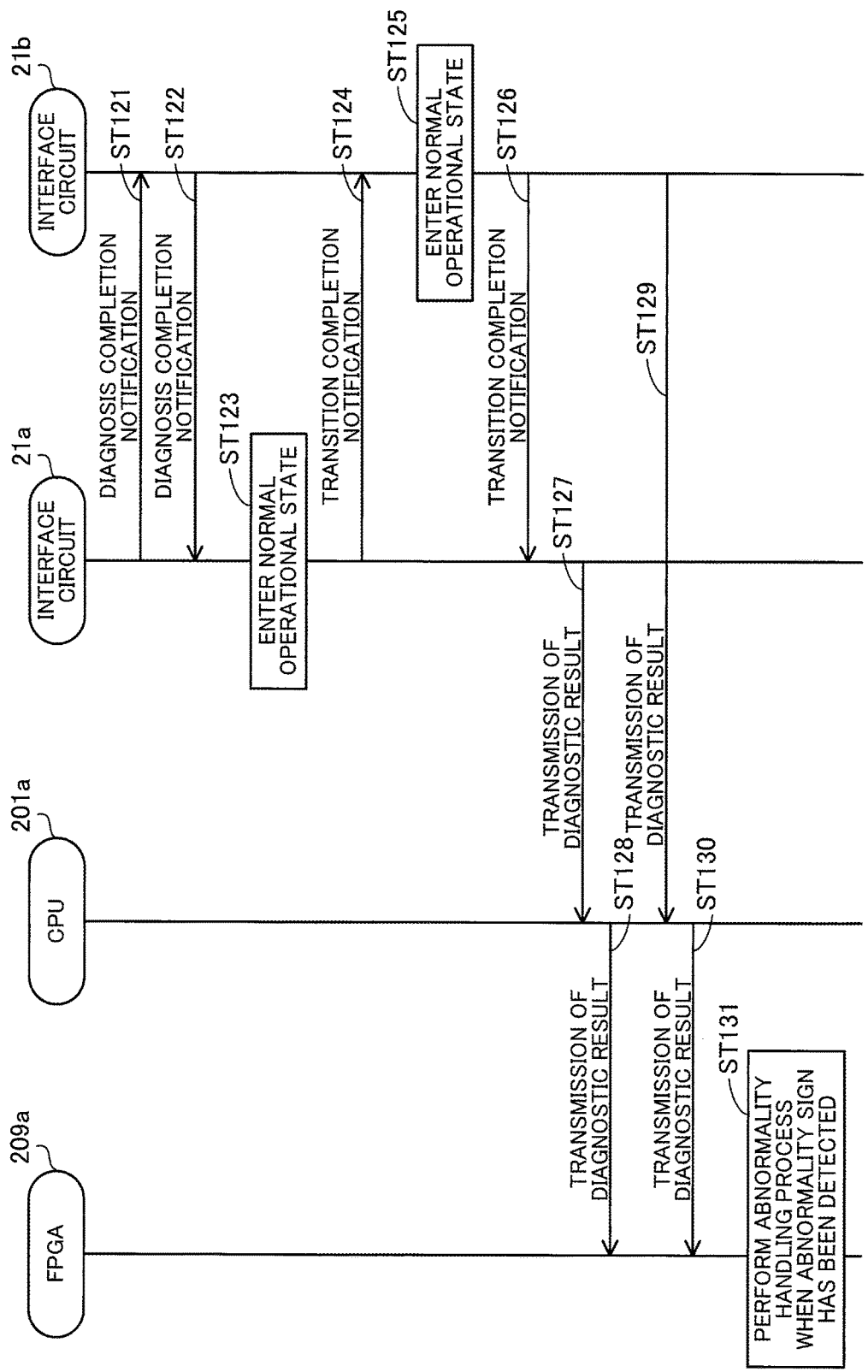
FIG. 21 is a second sequence diagram illustrating the example of the diagnosis control process during normal operation.

FIG. 21 is a second sequence diagram illustrating the example of the diagnosis control process during normal operation. The process of FIG. 21 is described according to the step numbers in the flowchart.

[Step ST121] After completing the diagnosis of the diagnosis target lane, the interface circuit 21*a* transmits diagnosis completion notification to the interface circuit 21*b*.

[Step ST122] After completing the diagnosis of the diagnosis target lane, the interface circuit 21*b* transmits diagnosis completion notification to the interface circuit 21*a*.

[Step ST123] After completing the transmission process in step ST121 and a receiving process of the information transmitted in step ST122, the interface circuit 21*a* exits the power saving state and enters the normal operational state (the L0 state).

[Step ST124] The interface circuit 21*a* transmits, to the interface circuit 21*b*, transition completion notification indicating the completion of the transition to the normal operational state.

[Step ST125] After completing a receiving process of the information transmitted in step ST121 and the transmission process in step ST122, the interface circuit 21*b* exits the power saving state and enters the normal operational state (the L0 state).

[Step ST126] The interface circuit 21*b* transmits, to the interface circuit 21*a*, transition completion notification indicating the completion of the transition to the normal operational state. In response to the transmission of the transition completion notification, the interface circuit 21*b* resumes communication with all the lanes being used prior to the start of the diagnosis, including the diagnosis target lane. In like fashion, in response to the reception of the transition completion notification, the interface circuit 21*a* resumes communication with all the lanes being used prior to the start of the diagnosis.

[Step ST127] The interface circuit 21*a* transmits the diagnostic result to the CPU 201*a*.

[Step ST128] The CPU 201*a* transmits, to the FPGA 209*a*, the diagnostic result transmitted in step ST127. The diagnosis control unit 209*aa* of the FPGA 209*a* identifies the result management table 280 corresponding to the channel extending from the interface circuit 21*a* to the interface circuit 21*b*. The diagnosis control unit 209*aa* updates, within the identified result management table 280, a diagnosis result associated with the diagnosis target lane with the diagnostic result received from the CPU 201*a*.

[Step ST129] The interface circuit 21*b* transmits the diagnostic result to the CPU 201*a*.

[Step ST130] The CPU 201*a* transmits, to the FPGA 209*a*, the diagnostic result transmitted in step ST129. The diagnosis control unit 209*aa* of the FPGA 209*a* identifies the result management table 280 corresponding to the channel extending from the interface circuit 21*b* to the interface circuit 21*a*. The diagnosis control unit 209*aa* updates, within the identified result management table 280, a diagnosis result associated with the diagnosis target lane with the diagnostic result received from the CPU 201*a*.

Note that, when receiving the diagnostic result in steps ST128 and ST130, the diagnosis control unit 209*aa* may instruct the CPU 201*a* to notify an external device (for example, the host device 400 or a management terminal of the storage device 100) of the diagnostic result. In this case, upon receiving the instruction, the CPU 201*a* causes the external device to display, for example, display information representing diagnostic content. Herewith, by visually perceiving the display information, the user is able to understand whether an abnormality sign has been detected, and if so, which lane of which device the abnormality sign has been detected from.

[Step ST131] When an abnormality sign has been determined to be present in the diagnosis target lane, the operation control unit 209*ab* of the FPGA 209*a* carries out the abnormality handling process. The abnormality handling process is described in detail later with reference to FIGS. 23 and 24.

According to the process of FIGS. 20 and 21 above, steps ST105 and ST106 allow the start of the diagnosis at each of the interface circuits 21a and 21b to synchronize. Then, steps ST121 and ST122 allow the end of the diagnosis at each of the interface circuits 21a and 21b to synchronize. Because bidirectional communication takes place between the interface circuits 21a and 21b, a communication error may occur if diagnosis is performed only in one direction. The occurrence of such a communication error is prevented by synchronizing the start and end of the diagnosis between the interface circuits 21a and 21b, as described above.

Figure 22:
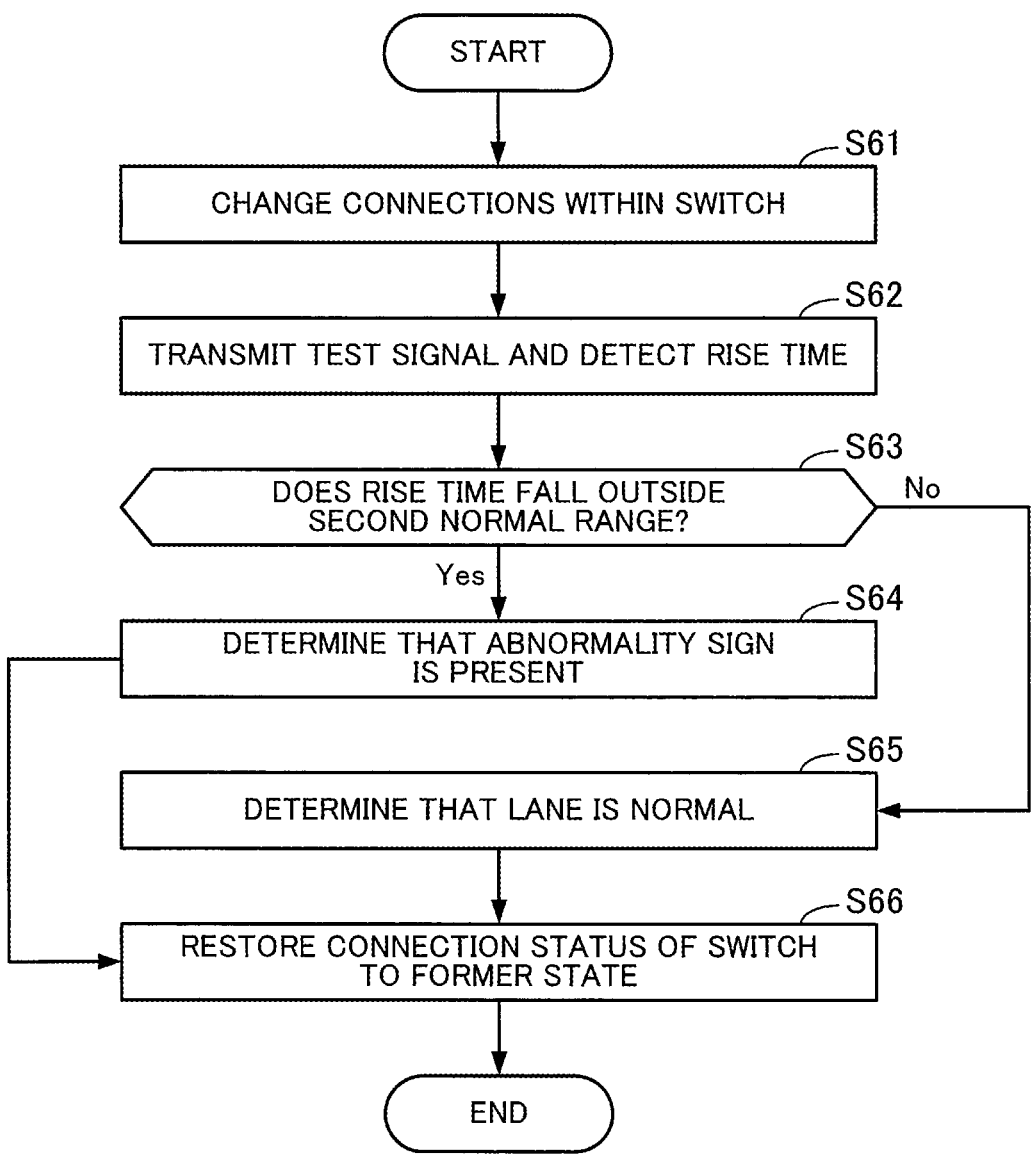
FIG. 22 is a flowchart illustrating an example of a diagnostic process performed by each interface circuit during normal operation.

FIG. 22 is a flowchart illustrating an example of a diagnostic process performed by each interface circuit during normal operation. The process of FIG. 22 corresponds to that performed by the interface circuit 21a in step ST111 of FIG. 20. Note that, also in step ST112 of FIG. 20, a similar process to that of FIG. 22 is performed by the interface circuit 21b. The process of FIG. 22 is described according to the step numbers in the flowchart.

[Step S61] The control circuit 220a instructs the switch 260a to implement a connection switch in such a manner that the designated diagnosis target lane is connected to the pulse generator 240a. According to the instruction, the switch 260a changes connections within the switch 260a. In this regard, communication with the interface circuit 21b is continued using, amongst lanes being used prior to the start of the diagnosis, lanes except for the diagnosis target lane.

Note here that a lane actually diagnosed in the channel is one associated with the number of the diagnosis target lane designated by the diagnosis control unit 209aa of the FPGA 209a via the driver 201aa of the CPU 201a. For example, according to the configurations of FIGS. 10 to 13, the lane 22a is diagnosed when Lane#0 is designated as a diagnosis target lane, and the lane 22b is diagnosed when Lane#1 is designated as a diagnosis target lane.

In step S61, when a lane other than Lane#0 is designated as a diagnosis target lane, only the connection of the lane to be actually diagnosed is changed within the switch 260a, as illustrated in FIG. 11. On the other hand, when Lane#0 is designated as a diagnosis target lane, connections within the switch 260a are changed in such a manner that a different lane on the channel is reconnected to Lane#0, as illustrated in FIG. 12. Note that, in the case where Lane#0 is designated as a diagnosis target lane, in step ST107 of FIG. 20, the control circuit 220a causes not Lane#0 but a lane amongst the remaining lanes, whose connection with a lane on the channel is disconnected (Lane#3 in the example of FIG. 12), to go idle.

[Step S62] The control circuit 220a instructs the pulse generator 240a to output a test signal. According to the instruction, the pulse generator 240a transmits a test signal. Herewith, the test signal is transmitted to the differential signal lines of the diagnosis target lane in the channel. The detection circuit 213a detects the rise time of the voltage in the differential signal lines, and notifies the control circuit 220a of the detected rise time.

[Step S63] The control circuit 220a acquires, from the memory 230a, the second normal range information (the times L3 and L4) corresponding to the diagnosis target lane. The control circuit 220a determines whether the detected rise time falls outside the second normal range. If the rise time falls outside the second normal range, the control circuit 220a moves to step S64. If the rise time falls within the second normal range, the control circuit 220a moves to step S65.

[Step S64] The control circuit 220a determines that an abnormality sign is present in the diagnosis target lane. Then, the control circuit 220a moves to step S66.

[Step S65] The control circuit 220a determines that the diagnosis target lane is normal.

[Step S66] The control circuit 220a instructs the switch 260a to restore the connection status to its former state prior to the execution of step S61. According to the instruction, the switch 260a changes connections within the switch 260a. Subsequently, the diagnostic process ends.

Thus, using the second normal range information, the control circuit 220a is able to determine whether an abnormality sign is present in the diagnosis target lane.

Figure 23:
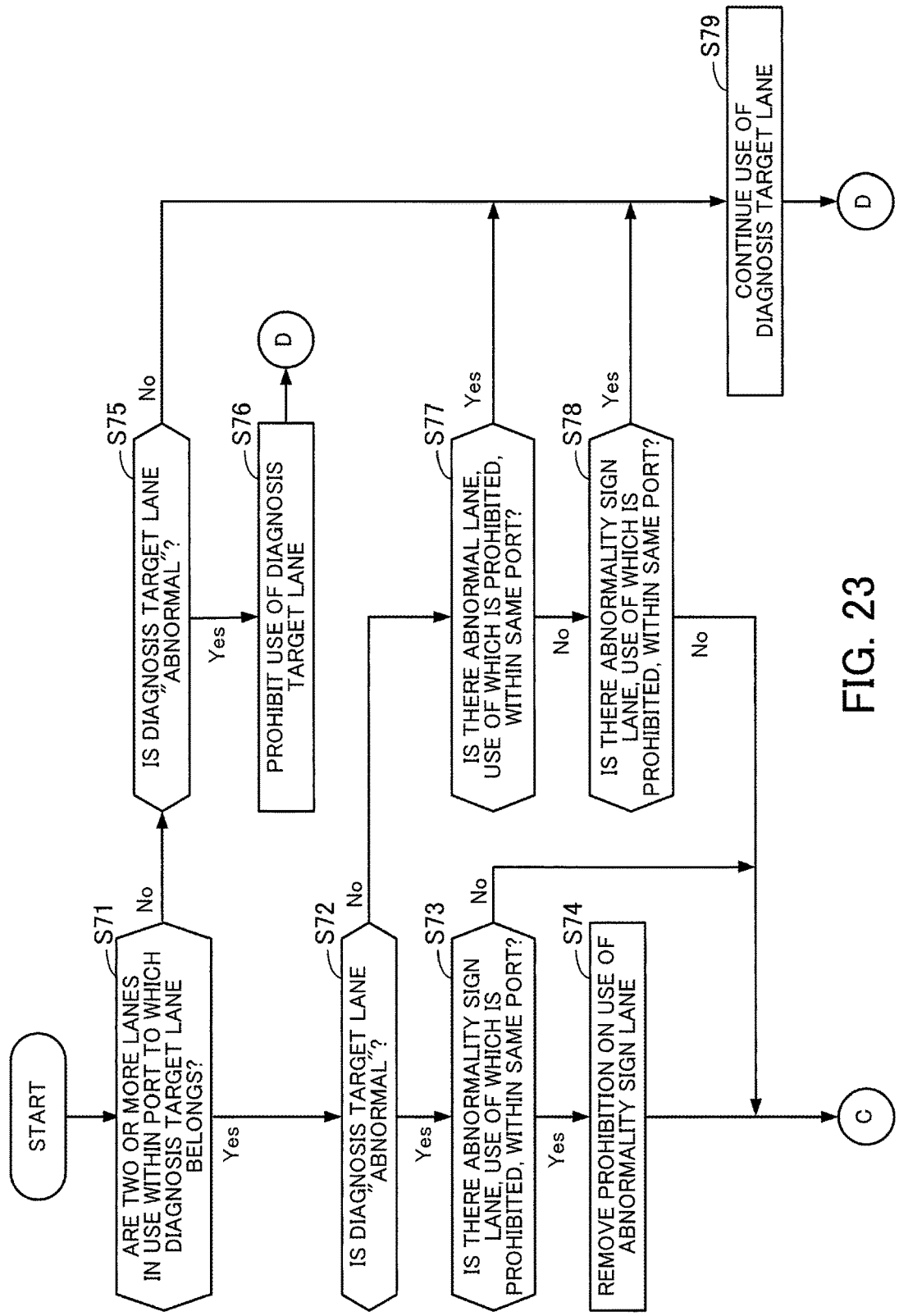
FIG. 23 is a first flowchart illustrating an example of an abnormality handling process.

Next described is the abnormality handling process. FIG. 23 is a first flowchart illustrating an example of the abnormality handling process. The process of FIG. 23 corresponds to that performed by the operation control unit 209ab of the FPGA 209a in step S54 of FIG. 19 or step ST131 of FIG. 21. In addition, the process of FIG. 23 is executed for each diagnosis target lane in which an abnormality or abnormality sign has been detected within the same port. The process of FIG. 23 is described according to the step numbers in the flowchart.

[Step S71] The operation control unit 209ab determines whether two or more lanes are in use within the port to which the diagnosis target lane belongs. The lanes in use are lanes whose use flag in the result management table 280 is set to "true". If two or more lanes are in use, the process moves to step S72. If there are not two or more lanes in use, the process moves to step S75.

[Step S72] The operation control unit 209ab determines whether the diagnostic result of the diagnosis target lane is "abnormal". If the diagnostic result is "abnormal", the process moves to step S73. If the diagnostic result is not "abnormal" (i.e., an abnormality sign has been detected), the process moves to step S77.

[Step S73] The operation control unit 209ab determines whether, within the port to which the diagnosis target lane belongs, there is an abnormality sign lane, the use of which is prohibited. The lane the use of which is prohibited is a lane whose use flag in the result management table 280 is set to "false". The abnormality sign lane is a lane whose diagnostic result in the result management table 280 is "abnormality sign". If there is an abnormality sign lane the use of which is prohibited, the process moves to step S74. If there is no such abnormality sign lane, the process moves to step S81.

[Step S74] The operation control unit 209ab selects one of abnormality sign lanes in the port to which the diagnosis target lane belongs, and removes a prohibition on the use of the selected lane. That is, the operation control unit 209ab registers, within the result management table 280, "true" in the use flag field corresponding to the selected lane. The operation control unit 209ab moves to step S81.

[Step S75] The operation control unit 209ab determines whether the diagnostic result of the diagnosis target lane is "abnormal". If the diagnostic result is "abnormal", the process moves to step S76. If the diagnostic result is not "abnormal" (i.e., an abnormality sign has been detected), the process moves to step S79.

[Step S76] The operation control unit 209ab prohibits the use of the diagnosis target lane. That is, the operation control unit 209ab registers, within the result management table 280, "false" in the use flag field corresponding to the diagnosis target lane. Then, the process moves to step S82.

[Step S77] The operation control unit 209*ab* determines whether there is an abnormal lane, the use of which is prohibited, within the port to which the diagnosis target lane belongs. The abnormal lane is a lane whose diagnostic result in the result management table 280 is "abnormal". If there is an abnormal lane the use of which is prohibited, the process moves to step S79. If there is no such abnormal lane, the process moves to step S78.

[Step S78] The operation control unit 209*ab* determines whether, within the port to which the diagnosis target lane belongs, there is an abnormality sign lane, the use of which is prohibited. If there is an abnormality sign lane the use of which is prohibited, the process moves to step S79. If there is no such abnormality sign lane, the process moves to step S81.

[Step S79] The operation control unit 209*ab* continues the use of the diagnosis target lane. That is, the operation control unit 209*ab* registers, within the result management table 280, "true" in the use flag field corresponding to the diagnosis target lane. Then, the process moves to step S82.

Figure 24:
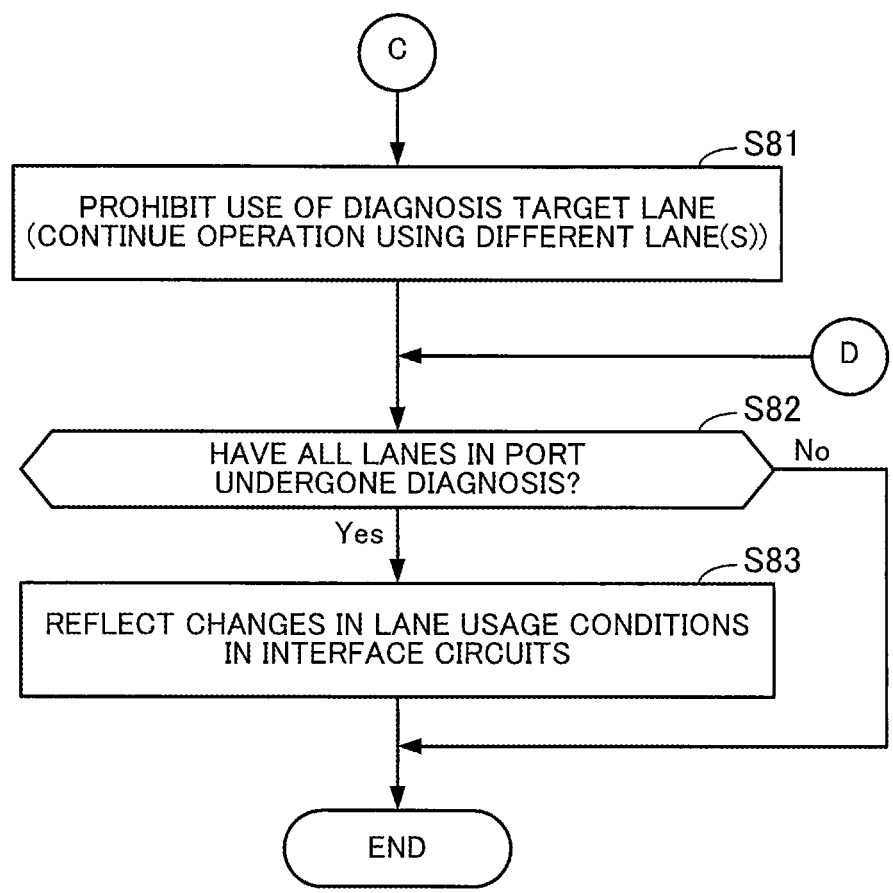
FIG. 24 is a second flowchart illustrating the example of the abnormality handling process.

FIG. 24 is a second flowchart illustrating the example of the abnormality handling process. The process of FIG. 24 is described according to the step numbers in the flowchart.

[Step S81] The operation control unit 209*ab* prohibits the use of the diagnosis target lane. That is, the operation control unit 209*ab* registers, within the result management table 280, "false" in the use flag field corresponding to the diagnosis target lane. In this case, because there is one or more lanes in use within the same port, the operation is continued using these other lanes.

[Step S82] The operation control unit 209*ab* determines whether all lanes within the port have undergone diagnosis. If one or more lanes remain undiagnosed, the process ends. If all the lanes within the port have undergone diagnosis, the process moves to step S83.

[Step S83] The operation control unit 209*ab* reflects changes in the lane usage conditions within the port in the interface circuits 21*a* and 21*b*. Specifically, the operation control unit 209*ab* identifies one or more lanes whose use flag in the result management table 280 has been changed. The operation control unit 209*ab* instructs the CPU 201*a* to resume, amongst the identified lanes, each lane whose use flag is set to "true" and shut down each lane whose use flag is set to "false". According to the instruction, the driver 201*aa* of the CPU 201*a* changes the lane usage conditions in the interface circuits 21*a* and 21*b*.

Note that, in step S83, the operation control unit 209*ab* may instruct the CPU 201*a* to notify an external device (for example, the host device 400 or a management terminal of the storage device 100) of the lane usage condition changes. In this case, upon receiving the instruction, the CPU 201*a* causes the external device to display, for example, display information representing the changes.

According to the process of FIGS. 23 and 24 above, lanes in which an abnormality or abnormality sign has not been detected are continued to be used. On the other hand, each lane in which an abnormality has been detected is shut down. In addition, a lane in which an abnormality sign has been detected is used only if, amongst the remaining lanes, there is a lane having been shut down due to detection of an abnormality. Thus, a lane with an abnormality sign detected is used only under the limited conditions, which reduces the probability of a communication disconnection attributed to aging degradation of capacitors while maintaining communication performance at the highest possible level. In the case of continuing the use of a lane with an abnormality sign detected, the operation control unit 209*ab* may instruct the interface circuit 21*a* via the CPU 201*a* to give reduced usage priority to the lane. Herewith, the probability of a communication disconnection in the lane is further reduced.

Note that, in response to an instruction to shut down the main lane (Lane#0), connections within the switch 260*a* are changed in the interface circuit 21*a* in such a manner that a different lane on the channel is reconnected to Lane#0, as illustrated in FIG. 12. That is, the connections within the switch 260*a* are changed in such a manner that the input terminals 262, 263, and 264 are connected to the output terminals 267, 268, and 269, respectively, while the output terminal 266 is left unconnected to any input terminal. This allows the use of the lane 22*a* with an abnormality or abnormality sign detected to be avoided while maintaining the use of Lane#0.

Next described is a process performed in the case where a port concerned has a low number of lanes. In an interface circuit, during diagnosis on a diagnosis target lane, communication is carried out by the remaining lanes of a port to which the diagnosis target lane belongs. The communication is thus continued by a smaller number of lanes than before the start of the diagnosis, which results in increased communication load on these lanes. As a result, communication timeouts tend to take place and large response delays may be observed. In view of these problems, a diagnosis control process illustrated in FIG. 25 next is performed in the case where a port has a small number of lanes.

Figure 25:
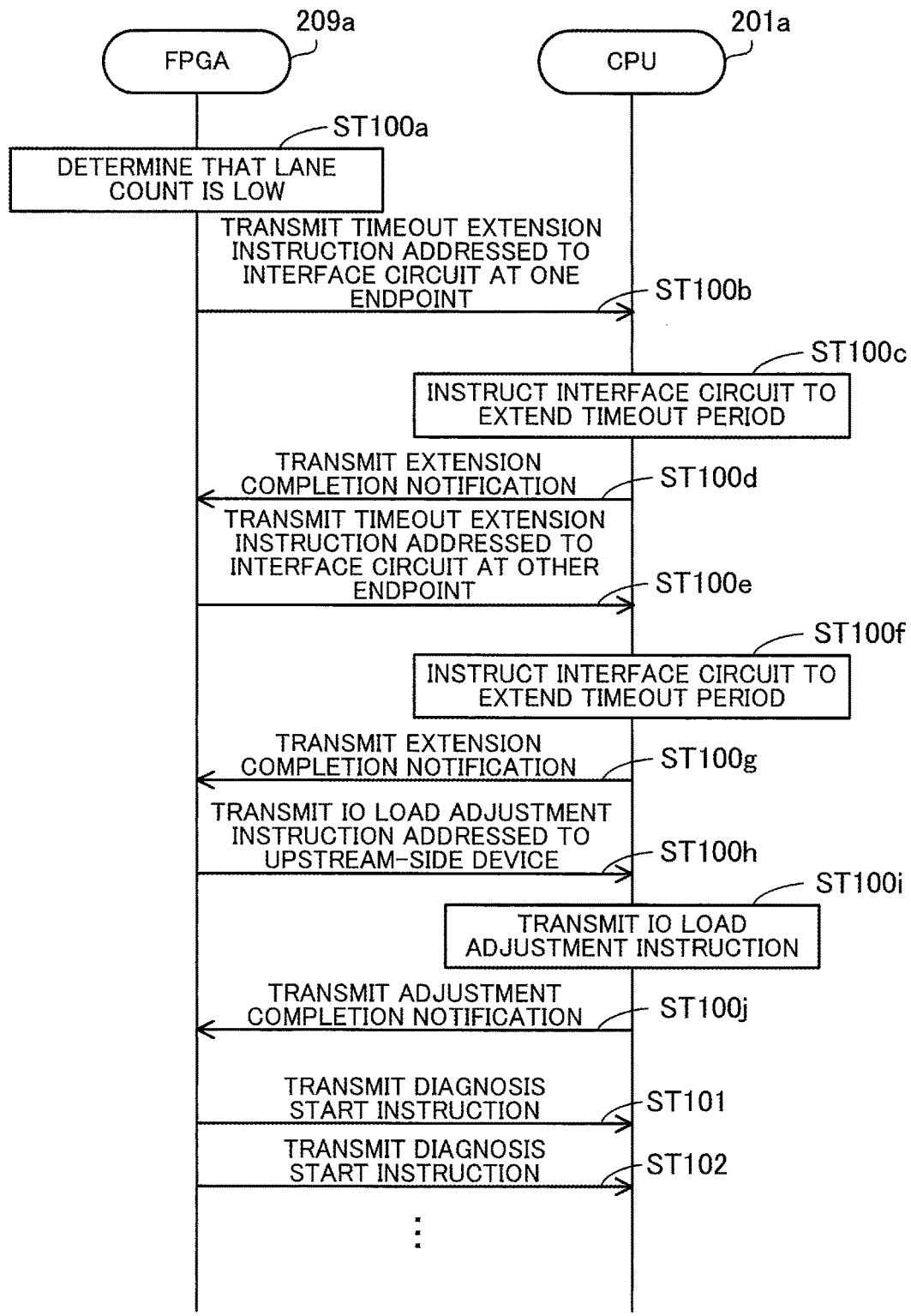
FIG. 25 is a sequence diagram illustrating an example of a diagnostic process performed when a port has a small number of lanes.

FIG. 25 is a sequence diagram illustrating an example of a diagnostic process performed when a port has a small number of lanes. In FIG. 25, the same step numbers are given to steps with processing details that are common to those of FIG. 20. Assume in the example of FIG. 25 that the channel between the IOC 205*a* and the SAS expander 206*a* is designated as a diagnosis target. Assume also that the interface circuit 21*a* of FIG. 20 is a SAS interface connected to one endpoint of the diagnosis target channel, on the IOC 205*a* side. Assume also that the interface circuit 21*b* of FIG. 20 is a SAS interface connected to the other endpoint of the diagnosis target channel, on the SAS expander 206*a* side. Note that processes of the CPU 201*a* are here implemented by the SAS-interface driver 201*ab*. First, step ST100*a* is executed in place of step ST100 of FIG. 20.

[Step ST100*a*] The diagnosis control unit 209*aa* of the FPGA 209*a* determines a diagnosis target lane with reference to the diagnosis target channel table 270, as in step ST100. In addition, the diagnosis control unit 209*aa* references the diagnosis target channel table 270 or the result management table 280 corresponding to a channel including the diagnosis target lane, to thereby identify the lane count of a port to which the diagnosis target lane belongs. Assume here that the diagnosis control unit 209*aa* determines that the lane count is low. For example, when the lane count of a port is 4 or less, it is determined to be low.

When the lane count is determined not to be low, step ST101 and the subsequent steps of FIG. 20 are executed. On the other hand, if the lane count is determined to be low, the following steps ST100*b* to ST100*j* are executed before step ST101 of FIG. 20.

[Step ST100*b*] The diagnosis control unit 209*aa* of the FPGA 209*a* transmits, to the CPU 201*a*, an instruction to extend a timeout period (hereinafter simply referred to as the "timeout extension instruction"), addressed to the interface circuit 21*a* connected to one endpoint of the diagnosis target channel.

[Step ST100c] The driver 201ab of the CPU 201a transmits the timeout extension instruction to the interface circuit 21a. The interface circuit 21a performs a setting process to extend the timeout period and transmits extension completion notification to the CPU 201a.

[Step ST100d] The driver 201ab of the CPU 201a transmits the extension completion notification to the FPGA 209a.

[Step ST100e] The diagnosis control unit 209aa of the FPGA 209a transmits, to the CPU 201a, a timeout extension instruction addressed to the interface circuit 21b connected to the other endpoint of the diagnosis target channel.

[Step ST100f] The driver 201ab of the CPU 201a transmits the timeout extension instruction to the interface circuit 21b. The interface circuit 21b performs a setting process to extend the timeout period and transmits extension completion notification to the CPU 201a.

[Step ST100g] The driver 201ab transmits the extension completion notification to the FPGA 209a.

[Step ST100h] The diagnosis control unit 209aa of the FPGA 209a transmits, to the CPU 201a, an input/output (IO) load adjustment instruction addressed to a device equipped with the interface circuit 21a, connected at the upstream of the diagnosis target channel, that is the IOC 205a. The IO load adjustment instruction instructs the IOC 205a to decrease the ratio of transmission data distributed to the SAS expander 206a and increase the ratio of transmission data distributed to the SAS expander 206b.

[Step ST100i] The driver 201ab of the CPU 201a transmits the IO load adjustment instruction to the IOC 205a. According to the instruction, the IOC 205a changes the data distribution ratio for both the SAS expanders 206a and 206b, and then transmits adjustment completion notification to the CPU 201a.

[Step ST100j] The driver 201ab of the CPU 201a transmits the adjustment completion notification to the FPGA 209a.

Upon receiving the adjustment completion notification, the diagnosis control unit 209aa of the FPGA 209a performs steps ST101 and ST102 of FIG. 20. From this point forward, the same processing described in FIG. 20 is performed.

Although no illustrative figure is given here, upon receiving the diagnostic results transmitted in steps ST128 and ST130 of FIG. 21, the diagnosis control unit 209aa of the FPGA 209a transmits instructions to reverse the instructions issued in steps ST100b, ST100e, and ST100h to the corresponding individual components via the CPU 201a.

According to the process of FIG. 25 above, it is possible to decrease the likelihood of communication interruption between the interface circuits 21a and 21b due to a timeout during diagnosis. In addition, the amount of data transmitted from the IOC 205a to the device enclosure 300 via the SAS expander 206a is reduced. This decreases the likelihood of decreased access performance from the host device 400 to the device enclosure 300 due to communication failure between the interface circuits 21a and 21b acting as a bottleneck.

Note that, between steps ST100b to ST100g and steps ST100h to ST100j, only one of them may be executed. In addition, the processing of steps ST100h to ST100j is applicable to the case where a communication channel from the CPU 201a or 201b to the device enclosure 300 branches along the way and diagnosis is performed by interface circuits located on the branched communication channels after the branch point.

(c) Third Embodiment

Figure 26:
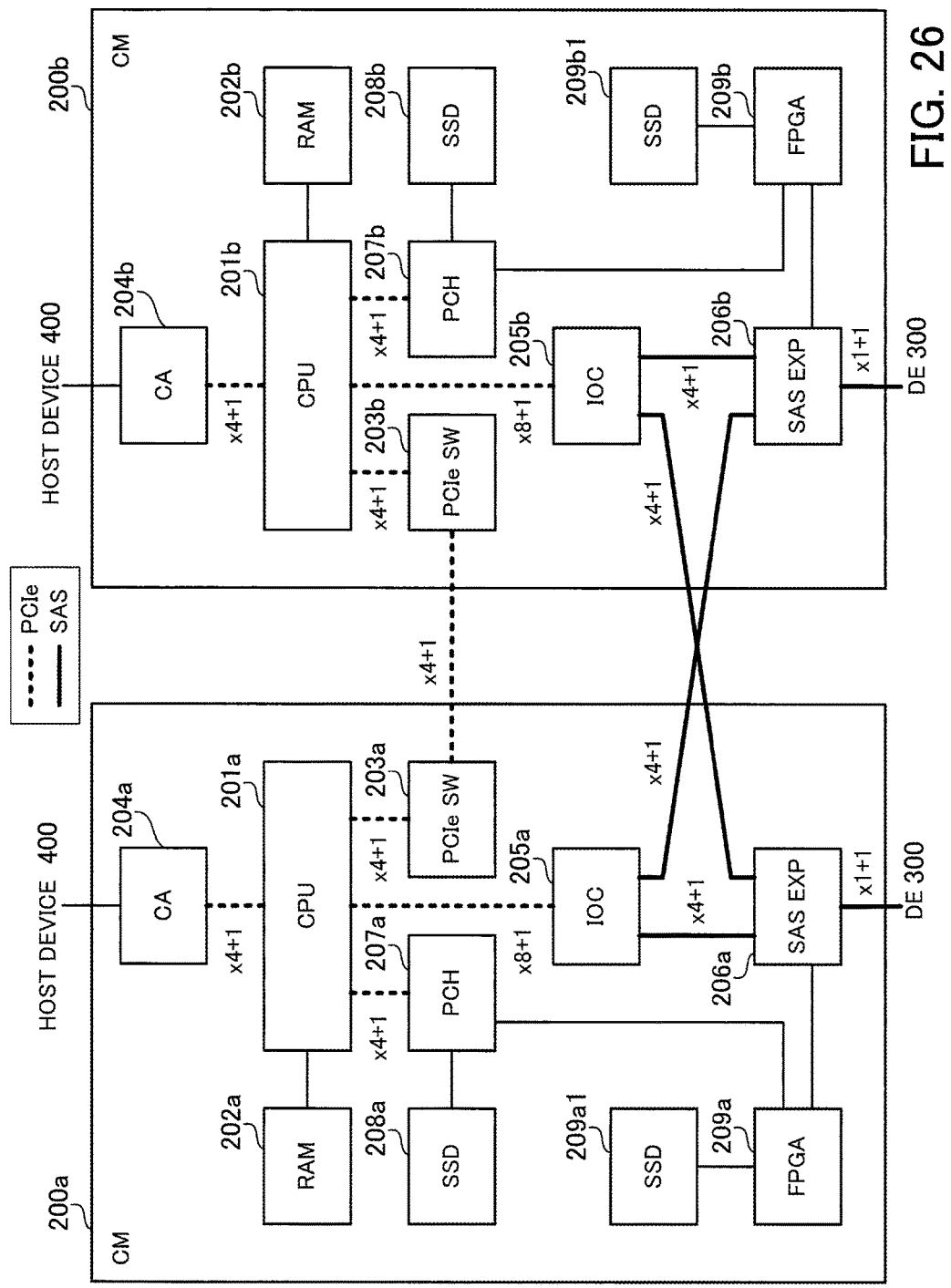
FIG. 26 illustrates an example of lane counts in a storage device according to a third embodiment.

Next described is a case where each of PCIe buses, PCIe cables, and SAS cables is provided with an auxiliary lane. FIG. 26 illustrates an example of lane counts in a storage device according to a third embodiment. The storage device of the third embodiment differs from that of the second embodiment only in the connection lane counts between interface circuits, as illustrated in FIG. 26. Specifically, an auxiliary lane used for communication during diagnosis is added to each channel between interface circuits. For example, a total of five lanes are connected between the CPU 201a and the PCIe switch 203a after an auxiliary lane is added thereto.

Figure 27:
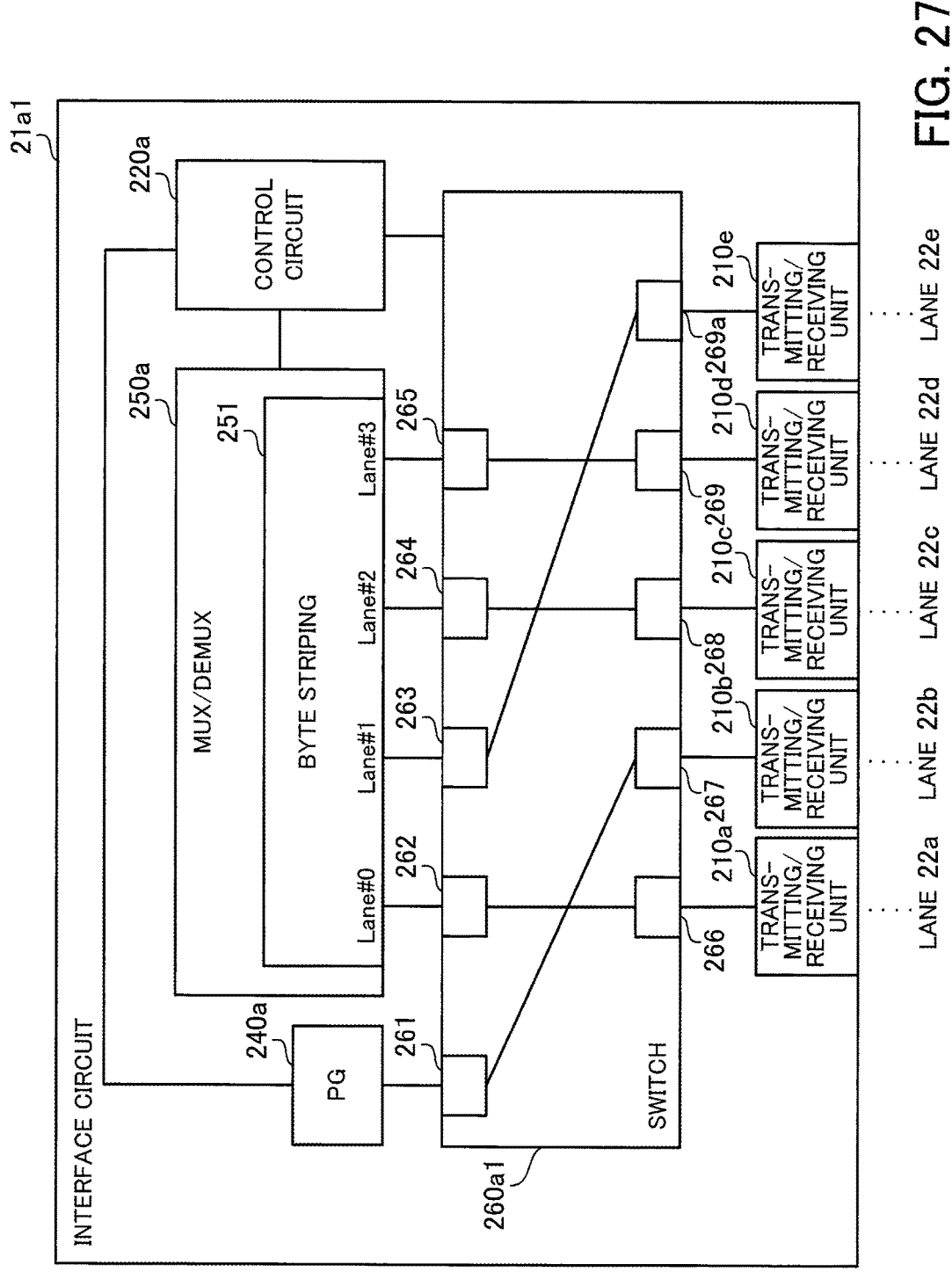
FIG. 27 illustrates an example of an internal configuration of an interface circuit according to the third embodiment.

FIG. 27 illustrates an example of an internal configuration of an interface circuit according to the third embodiment. According to the third embodiment, the interface circuit 21a of FIGS. 10 to 12 is modified as an interface circuit 21a1 of FIG. 27. The interface circuit 21a1 is connected to an other endpoint interface circuit by lanes 22a to 22e. Amongst the lanes 22a to 22e, the lane 22e is set as an auxiliary lane. The interface circuit 21a1 further includes a transmitting/receiving unit 210e for signal transmission and reception via the lane 22e. A switch 260a1 of the interface circuit 21a1 is different from the switch 260a of FIGS. 10 to 12 in further having an output terminal 269a used to connect to the transmitting/receiving unit 210e.

When no diagnosis is being performed, the input terminals 262 to 265 are connected to the output terminals 266 to 269, respectively, as in the case of FIG. 10. Then, in the case where diagnosis on Lane#1 is instructed, for example, the connection of the input terminal 263 is changed from the output terminal 267 to the output terminal 269a, and the input terminal 261 is then connected to the output terminal 267, as illustrated in FIG. 27. In this status, the transmitting/receiving unit 210b performs diagnosis on the lane 22b. At the same time, communication with the other endpoint interface circuit is continued using the lanes 22a and 22c to 22e. According to this configuration, the number of lanes used to communicate with the other endpoint interface circuit remains the same as before the start of the diagnosis. This prevents a decrease in communication speed and communication interruption due to a timeout caused by increased communication load between the interface circuit 21a1 and the other endpoint interface circuit.

In addition, according to the above-described configuration, because the number of lanes used remains the same during and not during diagnosis, there is no need to determine locations of channels to be diagnosed at the same time in consideration of access performance from the host device 400 to the device enclosure 300, which is described in relation to step S17 of FIG. 16. Further, this eliminates the need for the extension of the timeout period and the IO load adjustment illustrated in FIG. 25. As a result, it is possible to simplify the diagnosis control procedures without a decrease in access performance from the host device 400 to the device enclosure 300 and partial communication breakdown.

According to one aspect, it is possible to perform diagnosis of a communication abnormality sign while continuing data communication.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that various changes, substitutions, and alterations could be made hereto without departing from the spirit and scope of the invention.

What is claimed is:

1. An information processing apparatus comprising:
a first communication apparatus; and
a second communication apparatus configured to be connected to the first communication apparatus via a plurality of transmission paths,
wherein the first communication apparatus includes:
a transmitter configured to transmit, in response to designation of a transmission path targeted for diagnosis, selected amongst the transmission paths while the first communication apparatus is in a state capable of data communication with the second communication apparatus using the transmission paths, a test signal to the targeted transmission path while the state capable of data communication with the second communication apparatus is maintained by use of remaining transmission paths of the transmission paths other than the targeted transmission path, and
a processor configured to perform a procedure including:
diagnosing presence or absence of an abnormality sign in the targeted transmission path based on a result of detecting the test signal in the targeted transmission path and outputting a diagnostic result,
causing, at a start of the data communication with the second communication apparatus, the transmitter to transmit the test signal to each of the transmission paths and detecting, with respect to each of the transmission paths, a first rise time of rising transitions of the test signal in a waveform, and
determining, in response to the test signal transmitted to the targeted transmission path after the designation of the targeted transmission path, whether a second rise time of rising transitions of the test signal in a waveform detected in the targeted transmission path is included in a determination range determined based on the first rise time detected in the targeted transmission path, and diagnosing the presence or absence of an abnormality sign in the targeted transmission path based on a result of the determining.

2. The information processing apparatus according to claim 1, wherein:
the transmitter includes:
a test signal outputting unit configured to supply the test signal to a first input terminal amongst a plurality of input terminals,
a data outputting unit configured to supply data to be transmitted to the second communication apparatus by distributing the data across a plurality of second input terminals, which are remaining input terminals of the input terminals other than the first input terminal and whose count is the same as a count of the transmission paths, and
a switch configured to switch connection lines between the input terminals and the transmission paths, and
the procedure further includes:
controlling the switch to connect the second input terminals one-to-one to the transmission paths when data transmission to the second communication apparatus is performed using the transmission paths, and
controlling the switch to change connection of the targeted transmission path amongst the transmission paths to the first input terminal when the data transmission to the second communication apparatus is performed using the remaining transmission paths.

3. The information processing apparatus according to claim 2, wherein:
the procedure further includes controlling the switch to change, when, amongst the transmission paths, a first transmission path having been used as a main transmission path specified in a communication protocol is designated as the targeted transmission path, connection of the first transmission path to the first input terminal and also change connection of a third input terminal amongst the second input terminals, which has been connected to the first transmission path, to a second transmission path amongst the transmission paths other than the first transmission path to thereby maintain the second transmission path in an enabled condition as the main transmission path.

4. The information processing apparatus according to claim 1, further comprising:
a diagnosis control apparatus configured to sequentially select the targeted transmission path amongst the transmission paths and present the designation of the selected targeted transmission path to the first communication apparatus.

5. The information processing apparatus according to claim 4, wherein:
when a count of the transmission paths is equal to or below a predetermined threshold in causing the diagnosis on the targeted transmission path to be performed by presenting the designation of the targeted transmission path, the diagnosis control apparatus configures a setting in the first communication apparatus to extend a timeout period for a response from the second communication apparatus to the data communication from the first communication apparatus to the second communication apparatus.

6. The information processing apparatus according to claim 4, further comprising:
a third communication apparatus;
a fourth communication apparatus connected to the third communication apparatus via a plurality of transmission paths; and
a fifth communication apparatus configured to distribute data to be transmitted between the first communication apparatus and the third communication apparatus,
in causing the diagnosis on the targeted transmission path to be performed by presenting the designation of the targeted transmission path to the first communication apparatus, the diagnosis control apparatus instructs the fifth communication apparatus to decrease a ratio of a data amount distributed to the first communication apparatus.

7. The information processing apparatus according to claim 4, further comprising:
a plurality of communication apparatus groups each configured to include the first communication apparatus and the second communication apparatus,
wherein, based on diagnosis sequence information, the diagnosis control apparatus determines which transmission path included in which communication apparatus group amongst the communication apparatus groups is to be designated as the targeted transmission path, and
the diagnosis sequence information registers, when a first communication apparatus group amongst the communication apparatus groups is located on a first communication channel and each of second communication apparatus groups amongst the communication apparatus groups is located on one of a plurality of second communication channels branching off from the first communication channel and then connected to a single apparatus, combinations of transmission paths each designated as the targeted transmission path at same time based on a difference or a ratio between a count of the transmission paths included in the first communication apparatus group and a total count of the transmission paths included in each of the second communication apparatus groups, each of the combinations of transmission paths being composed of a transmission path selected from the transmission paths included in the communication apparatus groups and a transmission path selected from the transmission paths included in the individual second communication apparatus groups.

8. The information processing apparatus according to claim 1, wherein:
the first communication apparatus is connected to the second communication apparatus via an auxiliary transmission path in addition to the transmission paths, and
when the targeted transmission path is designated during the data communication with the second communication apparatus using the transmission paths, the transmitter transmits the test signal to the targeted transmission path while continuing the data communication with the second communication apparatus by use of the remaining transmission paths and the auxiliary transmission path.

9. A diagnosis control apparatus comprising:
a processor configured to perform a procedure including:
designating, while a first communication apparatus is in a state capable of data communication with a second communication apparatus using a plurality of transmission paths, a transmission path targeted for diagnosis amongst the transmission paths to the first communication apparatus to thereby cause the first communication apparatus to perform a diagnostic operation to transmit a test signal to the targeted transmission path while continuing the state capable of data communication with the second communication apparatus by use of remaining transmission paths of the transmission paths other than the targeted transmission path, and
configuring, when a count of the transmission paths is equal to or below a predetermined threshold in causing the diagnosis on the targeted transmission path to be performed by designating the targeted transmission path, a setting in the first communication apparatus to extend a timeout period for a response from the second communication apparatus to the data communication from the first communication apparatus to the second communication apparatus; and
a receiver configured to receive, from the first communication apparatus, a diagnostic result of presence or absence of an abnormality sign in the targeted transmission path, the diagnostic result being based on a result of detecting the test signal in the targeted transmission path.

10. The diagnosis control apparatus according to claim 9, wherein:
a third communication apparatus is connected to a fourth communication apparatus via a plurality of transmission paths, and the first communication apparatus and the third communication apparatus are installed in a fifth communication apparatus, and
the procedure further includes instructing, in causing the diagnosis on the targeted transmission path to be performed by designating the targeted transmission path to the first communication apparatus, the fifth communication apparatus to decrease a data amount distributed to the first communication apparatus when the fifth communication apparatus distributes transmission data according to a data amount distribution ratio between the first communication apparatus and the third communication apparatus.

11. A communication apparatus comprising:
a transmitter configured to transmit, in response to designation of a transmission path targeted for diagnosis selected amongst a plurality of transmission paths while the communication apparatus is in a state capable of data communication with a different communication apparatus using the transmission paths, a test signal to the targeted transmission path while the state capable of data communication with the different communication apparatus is maintained by use of remaining transmission paths of the transmission paths other than the targeted transmission path; and
a processor configured to perform a procedure including:
diagnosing presence or absence of an abnormality sign in the targeted transmission path based on a result of detecting the test signal in the targeted transmission path and outputting a diagnostic result, and
causing, at a start of the data communication with the different communication apparatus, the transmitter to transmit the test signal to each of the transmission paths and detecting, with respect to each of the transmission paths, a first rise time of rising transitions of the test signal in a waveform, and
determining, in response to the test signal transmitted to the targeted transmission path after the designation of the targeted transmission path, whether a second rise time of rising transitions of the test signal in a waveform detected in the targeted transmission path is included in a determination range determined on a basis of the first rise time detected in the targeted transmission path, and diagnosing the presence or absence of an abnormality sign in the targeted transmission path based on a result of the determining.

12. The communication apparatus according to claim 11, wherein:
the transmitter includes:
a test signal outputting unit configured to supply the test signal to a first input terminal amongst a plurality of input terminals,
a data outputting unit configured to supply data to be transmitted to the different communication apparatus by distributing the data across a plurality of second input terminals, which are remaining input terminals of the input terminals other than the first input terminal and whose count is the same as a count of the transmission paths, and
a switch configured to switch connection lines between the input terminals and the transmission paths, and the procedure further includes:
- controlling the switch to connect the second input terminals one-to-one to the transmission paths when data transmission to the different communication apparatus is performed using the transmission paths, and
- controlling the switch to change connection of the targeted transmission path amongst the transmission paths to the first input terminal when the data transmission to the different communication apparatus is performed using the remaining transmission paths.

* * * * *